US009205718B2

(12) United States Patent  
Lee

(10) Patent No.: US 9,205,718 B2  
(45) Date of Patent: Dec. 8, 2015

(54) DEVICE FOR ADJUSTING THE HEIGHT OF A VEHICLE

(71) Applicant: STEALTH INNOVATIVE SYSTEMS, LLC, Kailua, HI (US)

(72) Inventor: Steven David Lee, Kailua, HI (US)

(73) Assignee: STEALTH INNOVATIVE SYSTEMS, LLC, Kailua, HI (US)

( * ) Notice: Subject to any disclaimer, the term of this patent is extended or adjusted under 35 U.S.C. 154(b) by 0 days.

(21) Appl. No.: 14/636,065

(22) Filed: Mar. 2, 2015

(65) Prior Publication Data

US 2015/0174982 A1   Jun. 25, 2015

Related U.S. Application Data

(63) Continuation-in-part of application No. 14/144,002, filed on Dec. 30, 2013, now Pat. No. 8,967,630, which is a continuation of application No. 13/595,972, filed on Aug. 27, 2012, now Pat. No. 8,616,563.

(60) Provisional application No. 61/575,718, filed on Aug. 25, 2011.

(51) Int. Cl.
 *B60G 17/04* (2006.01)
 *B60G 17/052* (2006.01)
 (Continued)

(52) U.S. Cl.
 CPC ........... *B60G 17/052* (2013.01); *B60G 17/019* (2013.01); *B60G 17/0155* (2013.01); *B60G 17/0272* (2013.01); *B60G 17/08* (2013.01); *F16F 9/00* (2013.01); *F16F 9/56* (2013.01); *B60G 2500/30* (2013.01)

(58) Field of Classification Search
 USPC ............... 280/5.514, 124.145; 267/195, 203; 188/322.15, 283, 312
 See application file for complete search history.

(56) References Cited

U.S. PATENT DOCUMENTS

| 4,923,038 | A | * | 5/1990 | Lizell | ................... | B60G 17/015 188/266.2 |
| 5,078,370 | A | * | 1/1992 | McClellan | ........... | B60G 15/068 267/220 |

(Continued)

OTHER PUBLICATIONS

Porsche 911 GT3 Owner's Manual, pp. 8 and 64-65.

(Continued)

*Primary Examiner* — Toan To
(74) *Attorney, Agent, or Firm* — Martin E. Hsia; Keri Ann K. S. Krzykowski

(57) ABSTRACT

The present invention is a system for adjusting the height of vehicles. The vehicle is supported by a hollow cylinder and a piston having an undersized piston skirt is mounted on the suspension system's coil spring, and sealingly slidable within the cylinder bore. When a fluid is introduced into the expandable pressure space between the piston and the cylinder top, the piston and cylinder are forced apart, raising the vehicle. The undersized piston skirt can extend beyond the end of the cylinder, allowing the piston a greater travel length within the cylinder bore. The invention may be operated manually by a vehicle driver through push buttons, which can be the vehicle's existing cruise control buttons. Alternatively, the system can be automated using a control unit to automatically adjust ground clearance to avoid collision with obstacles in the vehicle's path. In another embodiment, the lift system, or any lift system, is prevented from activating, and deactivates (if previously activated) if the vehicle is travelling at excessive speed.

14 Claims, 15 Drawing Sheets

(51) Int. Cl.
    *B60G 17/08* (2006.01)
    *B60G 17/027* (2006.01)
    *F16F 9/00* (2006.01)
    *B60G 17/019* (2006.01)
    *F16F 9/56* (2006.01)
    *B60G 17/015* (2006.01)

(56) References Cited

U.S. PATENT DOCUMENTS

| | | | | |
|---|---|---|---|---|
| 5,487,535 | A * | 1/1996 | Carter | B60G 15/062 267/220 |
| 6,126,155 | A * | 10/2000 | Smith | B60G 15/067 267/220 |
| 6,257,605 | B1 * | 7/2001 | Zernickel | B60G 15/063 267/220 |
| 7,281,705 | B2 * | 10/2007 | Huprikar | B60G 7/04 188/321.11 |
| 7,364,177 | B2 * | 4/2008 | Handke | B60G 15/063 280/124.147 |
| 7,959,135 | B2 * | 6/2011 | Voelkel | B60G 15/14 267/64.21 |
| 8,967,630 | B2 * | 3/2015 | Lee | B60G 17/08 267/195 |

OTHER PUBLICATIONS

"The Electropneumatic Front Axle Lift System of the Porsche 997 GT3", ATZ magazine, Sep. 1, 2010, pp. 24-28, vol. 112.
2014 GTE Suspension Overview, http://www.elephantracing.com/tool-box/specs/991/GT3/991-gt3-suspension-overview.htm.

* cited by examiner

DEVICE FOR ADJUSTING THE HEIGHT OF A VEHICLE

This application is a continuation in part of, and claims the priority of U.S. nonprovisional patent application Ser. No. 14/144,002, filed on Dec. 30, 2013, which claims the priority of U.S. nonprovisional patent application Ser. No. 13/595,972 filed on Aug. 27, 2012, now U.S. Pat. No. 8,616,563 B2, which claimed the priority of U.S. provisional patent application No. 61/575,718 filed on Aug. 25, 2011, all of which are hereby incorporated herein by reference.

FIELD OF THE INVENTION

This invention generally relates to lift systems, and more specifically, lift systems for adjusting the ground clearance of vehicles to avoid collisions with obstacles, such as speed bumps or sloping driveways, which can scrape and damage the underbody of a vehicle.

BACKGROUND OF THE INVENTION

Ground clearance is the distance between any part of a vehicle (other than those parts designed to contact the ground, such as tires, tracks, skis, etc.) and the surface upon which the vehicle travels. Vehicle suspension systems maintain the distance between the axles of a vehicle's wheels and the other parts of the vehicle, and are usually designed to maintain a sufficiently high ground clearance to avoid obstacles anticipated to be in the vehicle's path, including (for example) to avoid scraping when going over a speed bump. Some vehicles, such as off-road vehicles, are designed with a high ground clearance to avoid obstacles encountered in rugged terrain, while other vehicles are designed with low ground clearance for high speed performance and/or sportier appearance. However, if the surface over which a vehicle travels has a speed bump, slope or other obstacle, then even if the distance between the vehicle's axles and other parts of the vehicle is maintained by the suspension system, the ground clearance at the ends or other parts of the vehicle may not be maintained, so that those ends or other parts may scrape that surface. A suspension system can use mechanical, pneumatic, hydraulic, magnetic, electronic, electro-magnetic, electro-mechanical or other means to support the weight of a vehicle and maintain the distance between the vehicle's axles and other parts of the vehicle. Conventionally, a suspension system is mechanical, and contains springs to provide a restoring force, and shock absorbers to provide a damping force, to restore the distance between the vehicle's axles and other parts of the vehicle after the vehicle encounters a bump or other obstacle. By contrast, a lift system is a system that increases the ground clearance when activated, and decreases the ground clearance when deactivated. A lift system can be used together with an active suspension system, that is, a suspension system that actively restores the distance between the vehicle's axles and the other parts of the vehicle when the vehicle encounters an obstacle, such as a bump. An active suspension system can be, for example, a system that senses an obstacle or change in the distance between the vehicle's axles and other parts of the vehicle, calculates an appropriate mechanical, hydraulic, pneumatic, magnetic or other restoring force or damping force or other force (in response to the sensed obstacle or sensed change in distance between the axles and other parts), and then applies that calculated force to the suspension system when the vehicle encounters the sensed obstacle or sensed change in ground clearance, to restore the distance between the axles and other parts. By contrast, passive suspension systems, such as conventional spring and shock absorber systems, do not sense obstacles or changes in distance between the axles and other parts, calculate forces in response to the sensed obstacle or sensed change in distance between axles and other parts, and then apply the calculated forces to the suspension system.

The benefits of low ground clearance and lower vehicle height are numerous and include less wind resistance, better fuel economy, better acceleration, better cornering, and better braking. Another significant advantage of low ground clearance is that it allows for better aesthetics such as providing a lower, sleeker, and sportier appearance that is desired by many drivers.

Many modern vehicles are designed and built with low ground clearance for the sportier appearance. Vehicle owners also lower their vehicles, through after-market modification, for enhanced performance, fuel economy and sportier appearance. One of the most common ways to lower a vehicle is through the use of a coilover, a vehicle suspension device that incorporates a coil spring positioned over and around a shock absorber shaft that is connected to a shock absorber body. Use of a coilover allows for a limited amount of height adjustment by adjusting the height of the coil spring's lower mounting point.

Other common ways to lower a vehicle include using shorter coil springs on the vehicle's suspension or adjusting the height or length of the suspension springs.

Reducing a vehicle's ground clearance height frequently results in undesired contact (collisions or scraping) between the vehicle and obstacles in the vehicle's path, such as speed bumps, sloping driveways and uneven surfaces. Unfortunately, when contact occurs, the vehicle is often damaged from the contact. Sometimes the obstacles are too large or too tall for the vehicle to travel over them. In the past, other vehicle lift systems have been developed, but they fall short of providing an adequate solution for many reasons. For example, some lift systems are designed and built to be vehicle-specific and are not readily adaptable to other vehicles. On the other hand, lift systems designed to fit a variety of vehicles often require the removal or replacement of existing components, resulting in added costs for the replacement components and loss of performance from the removal of critical or beneficial existing components. Such removed components may include coil springs, dust sleeves and bump stops.

Some prior art lift systems employ pressurized rubber air bags or air sleeves to replace coil springs in a suspension system. These systems do not retain the performance characteristics and benefits of metal coil springs, and incur the added cost of replacing the existing shock absorbers and/or metal coil springs with air bags or air sleeves. Moreover, components in lift systems that use metal coil springs may be so tall or thick that they do not fit into vehicles with the existing suspension springs. In such cases, the coil springs must be replaced with shorter springs resulting in a loss of suspension performance from the shorter spring.

Some prior art lift systems use hollow double-walled cylinder designs having concentric inner and outer cylinder walls. This design is complicated, more costly to manufacture, and more difficult to protect against dust and contaminants. These systems are also less efficient in the use of stored air pressure. They also have reduced pressurized surface areas on which the pressure to the piston can act, resulting in inefficient use of power and the need for a larger storage tank to hold the compressed air (or other fluid), which is used to lift the vehicle. The tank required may reduce useable storage space, or even be so large that it cannot fit into many vehicles in a practical manner, and therefore is not able to be used in those vehicles.

It is a further object of the present invention to eliminate or reduce the effects of environmental contaminants and the damage they cause to lift system components. Lift system components are typically installed near the vehicle's suspension system's coil springs and the tires. The lift system components are typically exposed to environmental contaminants such as dust, water, mud, sand or snow.

Prior art lift systems with cylinder and piston actuators that are positioned around the coil springs, and that have exposed cylinder bores, are susceptible to damage caused by such environmental contaminants. While the damage to the cylinder bores and the piston-bore seals is an obvious problem, an effective solution for protecting these components from environmental contaminants has not been obvious. Developing a solution for protecting the cylinder bores from environmental contaminants has been problematic because: 1) the cylinder bores are adjacent to a moving coil spring, and 2) because a piston must be able to slide within the cylinder bore without restriction, and 3) because the space for the cylinders is limited, and 4) the cylinders are frequently located near a spinning tire that may move and turn as the vehicle is operated. These space constraints and moving elements impose many design limitations that prevent the use of many conventional solutions that would otherwise be suitable to protect the cylinder bore.

For example rubber bellows would not be an effective solution for sealing around an active and long coil spring. Even if a rubber bellows were to be used, it would be bulky and it would introduce another component that would be subject to wear and deterioration and it would introduce additional problems.

Prior art vehicle lift systems with cylinder and piston actuators that are positioned around the coil springs, such as those used by Umbrella Auto Design, Roberuta, Phantom VIP, Fortune Auto Muller and Stance-Solutions do not provide protection from environmental contaminants to their cylinder bores. They all use exposed and unprotected cylinder bores with the problems described above.

Prior art vehicle lift systems with cylinder and piston actuators that press against a coil spring are prone to misalignment of the piston within the cylinder bore because the coil spring exerts uneven forces upon the piston. The spring pressure against the lift system's piston is uneven for many reasons such as off-centered springs or movement of the suspension system. In some cases, the springs could be mounted off-centered relative to the piston, as shown in FIGS. 17 and 18. The uneven spring pressure against the lift system's piston causes uneven forces upon the piston and this can result in the piston tilting or moving off center (mis-alignment) within the cylinder bore.

In prior art, the tilting of the piston can result in the piston rubbing against the cylinder bore and causing damage to the cylinder bore and to the piston-bore seal(s). In extreme cases, the piston can tilt enough to become seized within the cylinder bore.

In prior art lift systems, the pistons are made longer than would otherwise be necessary to reduce tilting or misalignment of the piston within the cylinder bore. The pistons are cylindrical with piston-bore seals at the top of the piston and at the bottom of the piston. The pistons are relatively long with seals at the top and the bottom of the piston in an attempt to reduce the tilting or misalignment of the piston and the resulting damage and malfunctions that could occur. In these prior art lift systems, increasing the length (height) of the piston helps to reduce damage to the cylinder bore, however it reduces the effective stroke or length of travel within a cylinder of a given length. These relatively long pistons usually require the use of shorter coil suspension springs to offset the added piston height. The use of shorter coil springs reduces the suspension's travel and performance.

Prior art lift systems that use bump stops, typically do so in a manner that reduces the effective pressurized area above the bump stop, making the system less efficient and requiring more air pressure and/or stored pressurized air to operate properly. They also do not provide a means for having the bump stop travel in tandem with the piston without touching and causing any wear upon the shock absorber rod.

Some other prior art systems use hydraulic pumps and pressurized liquid to raise the vehicle, and use hollow, double-walled cylinders having concentric inner and outer walls. This type of system is less efficient and requires significantly higher operating pressures to be effective. Hydraulic systems also require more costly hydraulic pumps and/or tanks filled with heavy hydraulic fluid and have the risk of fluid leaks and/or oil spills.

Hydraulic systems typically use cylinder and piston assemblies that are relatively thick (tall) positioned on the top or bottom of the coil spring. They add considerable height to the spring and usually require the use of shorter coil springs. Using shorter coil springs normally results in a reduction of suspension travel and reduced suspension performance.

Hydraulic systems also pump fluid only when it is needed to lift a vehicle. Thus, they are slower acting systems that require strong pumps to raise a vehicle with enough speed to be effective. They draw higher amperage on a vehicle's electrical system. Further, because hydraulic systems typically raise vehicles slowly, they are not practical to use in many driving situations.

Prior art lift systems also do not have an adjustable, automated activation system that automatically senses obstacles in a vehicle's path and raises or lowers the vehicle based on the vehicle's proximity to the obstacles and its speed.

Other lift systems use components, such as large pneumatic cylinders or large air tanks that are often too large to install into many vehicles. These larger components also add undesirable weight to the vehicle, thus decreasing vehicle performance and efficiency.

Other systems that use compressed air tanks may also allow condensation (water) in the air tank to be passed through the air outlet port under certain driving conditions, which may cause surges of the water (surge water). Examples of such conditions include acceleration, braking and cornering. The surge water that passes through the air lines to the valves, pressure sensors, cylinders and other components has detrimental effects on these components.

Prior art lift systems include: Umbrella Auto Design, Roberuta, Phantom VIP, Fortune Auto Muller, Stance-Solutions, Top Secret, Mode Parfum, Skipper, KW Hydraulic Lift System, Tech-Art, Ram Lift Pro, AirForce, AirRex, Air Lift, and Accuair.

It is an object of the present invention to provide an affordable lift system that is adaptable to a large variety of vehicles.

It is another object of the present invention to provide an efficient lift system that only requires small pressurized cylinders and storage tanks and to provide increased piston travel (stroke) within a cylinder of a given length to provide increased lifting capabilities while using shorter cylinders.

It is another object of the present invention to provide a lift system that adds only a small amount of height to the coil spring.

It is another object of the present invention to provide an effective means to eliminate wear and damage to cylinder bores caused by contact of the pistons with the cylinder bores by eliminating contact of the pistons with the cylinder bores.

It is another object of the present invention to provide an effective means to control the tilting of pistons in cylinder bores of lift systems and to eliminate the problems associated with the tilting of pistons in cylinder bores of a lift systems.

It is another object of the present invention to provide an effective means to eliminate wear and damage to cylinder bores and to piston-bore seals caused by environmental contaminants.

It is a further object to provide means for operating the system in safe manner that does not require the driver to take his eyes off the road (to look for and operate switches), and to make the operation of the system automatic and hands-free.

It is a further object to provide an effective means to automatically adjust the height of a vehicle to provide adequate ground clearance to traverse over obstacles in the vehicle's path.

It is still a further object to overcome the drawbacks relating to the prior art devices discussed above and to provide at least some of the benefits described below.

DISCLOSURE OF THE INVENTION

The above and other objects are achieved by a device for lifting a vehicle that has a support or suspension system to support the weight of the vehicle. The support or suspension system preferably comprises a coil spring and shock absorber with a shock absorber shaft and a shock absorber body. The coil spring may be coiled around the shock absorber shaft. Alternatively, a vehicle may not have a shock absorber or the shock absorber may be mounted separately and apart from the coil spring. In some vehicles the weight of the vehicle is not supported by a suspension system with coil springs. They may use leaf springs, disc springs, air springs or other mechanical, hydraulic, pneumatic, magnetic, electrical, electro-mechanical devices or solid mounts to support the weight of the vehicle. The present invention can be adapted to accommodate a wide variety of vehicles with these and other types of conventional or other suspension or weight support systems.

In the preferred embodiment shown in FIG. 1 the device further preferably comprises a hollow cylinder having a cylinder inner diameter (cylinder bore) larger than the coil spring outer diameter. The cylinder is formed by a cylinder top with a cylinder top rim, and cylindrical cylinder side walls connected to, and extending downwardly from the cylinder top rim to a cylinder bottom. The cylinder top and said cylinder side walls define an inner cylinder bore. An inlet port extends inwardly from the cylinder top into the hollow cylinder. There is also an inner circumferential retaining ring groove located near the cylinder bottom. A retaining ring is also retained in the inner circumferential retaining ring groove. The retaining ring creates a barrier between the piston skirt (described below) and the cylinder side walls to prevent contaminants from entering said cylinder bore. The retaining ring also acts as a positive stop against the piston's lower circumferential rim (described below), thus limiting the travel of the piston.

The device also comprises a substantially cylindrical piston having a piston diameter less than the cylinder bore diameter, slidable within the cylinder bore. The piston has a circular piston top with a piston top rim and a piston lower circumferential rim.

Preferably, a cylindrical coil spring flange extends downwardly from the piston top. Preferably, a bump stop flange extends inwardly—from the coil spring flange. Preferably, a bump stop having one or more bump stop grooves is retained in the bump stop flange.

Preferably, there is also an outer circumferential piston-bore seal groove parallel to, and downwardly spaced apart from, the top outer circumference of the piston. A piston-bore seal is also preferably retained in the piston-bore seal groove. The piston-bore seal preferably contains a wiper to clean the cylinder bore when the cylinder and the piston slide apart.

Preferably, there is a piston lower circumferential rim 37 on the circumference of said piston top. The piston lower circumferential rim 37 has a diameter that is larger than the inner diameter of the retaining ring. This piston rim limits the travel of the piston by contacting the retaining ring at the bottom of the cylinder.

Preferably, this device also contains a substantially cylindrical piston skirt that extends downwardly from the piston lower circumferential rim.

The piston skirt diameter is undersized to be substantially smaller than the cylinder bore diameter and smaller than the inside diameter of the retaining ring. The undersized piston skirt preferably covers the full length of the cylinder bore to protect the cylinder bore from contaminants.

Preferably the piston diameter and the piston skirt outer diameter are sufficiently less than the cylinder bore diameter whereby the piston and the piston skirt can tilt within the cylinder bore up to 5 degrees or more when the piston is being installed into the cylinder.

Preferably, the piston skirt has a circular piston skirt bottom flange attached to or integrally formed with the piston skirt bottom that extends outwardly from the piston skirt. Preferably the bottom flange is positioned immediately below the retaining ring when the piston is positioned fully within the cylinder.

Preferably the piston skirt, the piston skirt bottom flange, the retaining ring and the cylinder inner diameter are sized and positioned to fit closely together to form a system of interlocking barriers to prevent environmental contaminants such as dust, sand, water, mud and snow from reaching the cylinder bore. The undersized piston skirt, the piston skirt bottom flange, the retaining ring and the cylinder inner diameter eliminate virtually all of the damage to the bore caused by environmental contaminants.

Other prior art devices without this system of contaminant barriers such as those used by Umbrella Auto Design, Roberuta, Top Secret, Phantom VIP, Fortune Auto Muller and Stance-Solutions have cylinder bores that are exposed to the environmental contaminants and they suffer from contaminants that damage the cylinder bores and the piston-bore seals.

While such damage to the exposed cylinder bores and the piston-bore seals is obvious, the solution to the problem was not obvious because the cylinder bores surround moving coil springs that restrict the methods for sealing the cylinder bore from contaminants. The damage to such exposed cylinder bores and piston-bore seals can be so serious that those devices with unprotected, exposed cylinder bores are not suitable for use by OEM automobile manufacturers.

The device illustrated in FIG. 1 virtually eliminates all of the damage and wear to the cylinder bores and to the piston-bore seals caused by environmental contaminants, making the device much more desirable to OEM automobile manufacturers who desire trouble-free performance and maintenance-free systems.

The retaining ring and the undersized piston skirt do not limit the stroke or travel of the piston. The undersized piston skirt travels beyond the bottom of the cylinder and passes through the retaining ring when the piston slides down within the cylinder bore.

In prior art illustrated in FIGS. 2 and 3, the coil springs may press unevenly upon the piston's spring perch. The uneven force tends to tilt the piston. In the present invention, the extended and undersized piston skirt acts as an extended lever that is connected to the piston top to prevent the piston from tilting excessively once all of the components have been assembled. This extended and undersized piston skirt does not limit the stroke of the piston.

The undersized piston skirt does not touch the cylinder bore when the piston slides within the cylinder, thus the piston skirt causes no wear upon the cylinder bore. Preferably the outside diameter of the piston skirt is sized to fit closely to the inside diameter of the retaining ring whereby the retaining ring prevents the piston skirt and the piston top from tilting excessively within the cylinder.

The piston diameter and the skirt diameter are preferably sufficiently less than the cylinder bore diameter to allow the piston skirt to tilt or wobble within the cylinder bore during assembly and before the retaining ring, or an alternative cylinder ring, is installed near the bottom of the cylinder. The ability of the piston to tilt within the cylinder bore facilitates the assembly of the piston with a piston-bore seal into the cylinder.

The skirt is preferably tapered inwardly between the skirt top and the skirt bottom. The piston and the piston skirt can also preferably be integrally formed instead of being separate components. The piston top, cylinder top, piston bore seal, and the cylinder side walls form an expandable pressure space that is in fluid communication with the inlet port.

The device is activated when a pressurized fluid enters through the inlet port into the expandable pressure space and causes the piston and cylinder to slide apart, thereby raising the vehicle. The device is deactivated when the pressurized fluid exits through the inlet port from the expandable pressure space and causes the piston and cylinder to slide together, thereby lowering the vehicle. The pressurized fluid is preferably pressurized air.

Preferably the piston-bore seal is sized to keep the piston top centered within the cylinder bore, and the outside diameter of the piston is sized sufficiently smaller than the cylinder bore diameter so that the piston never touches the cylinder bore when the piston with the piston-bore seal, the piston skirt and the retaining ring are installed. Preferably the piston-bore seal is the only part that touches the cylinder bore, and the cylinder bore and the seal experience very little wear and a long working life resulting in lower maintenance and higher reliability than other devices wherein the piston can touch and damage the cylinder bore.

The present invention also preferably contains an interface operably connected to the device that uses existing original equipment manufacturer switches such as cruise control switches to activate and deactivate the device, and a control unit, preferably an electronic control unit, operably connected to the device for automatic sensing of the vehicle's ground clearance and speed. The control unit can also be an optical or optoelectronic or other control unit that can perform the same functions as an electronic control unit.

Preferably, the lift system is automatically activated if there is less than the desired ground clearance in the vehicle's path, such as if there is an obstacle (such as a speed bump) in the path. Preferably also the lift system is automatically deactivated if there is more than the desired ground clearance in the vehicle's path, such as if the system has been activated, but the obstacle (such as a speed bump) is no longer in the vehicle's path.

Preferably also, activation of the lift system is automatically prevented if the vehicle is traveling at an excessive speed, such as where raising of the vehicle by the lift system would adversely affect the handling of the vehicle, or where the speed would interfere with the operating of the cruise control. Preferably also, the lift system automatically deactivates if the vehicle is traveling at an excessive speed, to avoid adversely affecting handling of the vehicle, or where the speed would interfere with the operating of the cruise control.

DESCRIPTION OF A PRESENTLY PREFERRED EMBODIMENT

Figure 1:
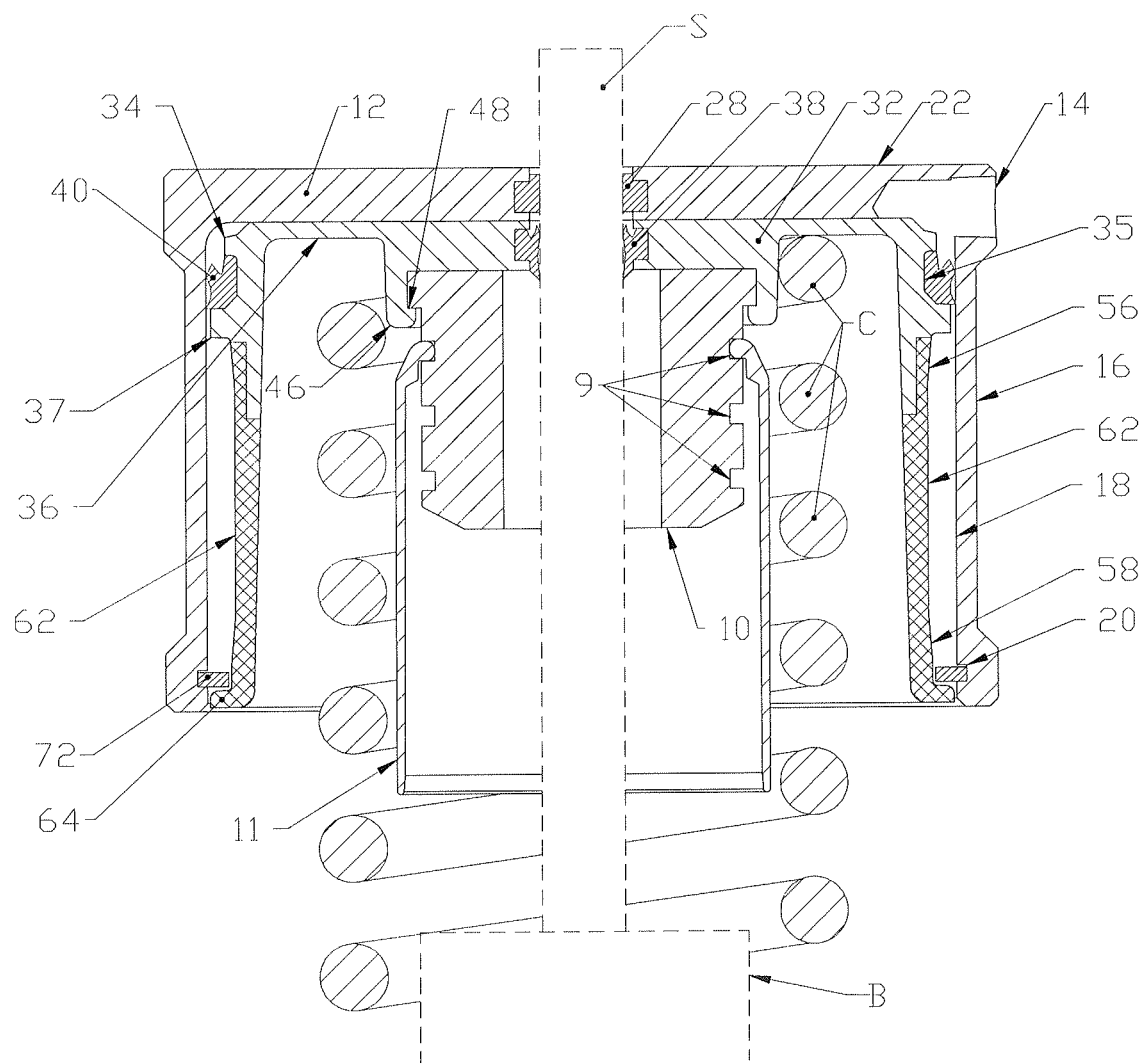
FIG. 1 is a longitudinal cross-sectional view of the present invention's cylinder, piston and undersized piston skirt for adjusting the height of a vehicle.

Referring to FIG. 1, shown is a longitudinal cross-sectional view of the presently preferred embodiment of the invention comprising a lifting device that includes a coil spring C beneath a vehicle's chassis (or body). The circular top 12 of the hollow cylinder rests against the vehicle's underbody (or chassis) to support the weight of the vehicle. A piston 32 is positioned inside the cylinder 22 and is proportioned for travel within the cylinder bore 18. The piston 32 is situated at the top of the coil spring C. The weight of the vehicle is supported by coil springs C through the springs' contact with the pistons' spring perch section 36. The cylinder 22, piston 32, and optional rubber or plastic bump stop 10, and optional dust shield (11) are preferably coaxial with each other.

The cylinder 22 preferably has a substantially circular cylinder top 12. The cylinder has an inlet port 14 for the passage of pressurized fluids or gasses into and out of the cylinder 22 for activation and deactivation of the lift system. The cylinder 22 is hollow and has a single wall, with an outer cylinder wall surface 16 and an inner cylinder wall surface (or cylinder bore) 18.

The piston 32 rests inside the hollow cylinder 22 (when the lift system is deactivated) and is proportioned for travel within the cylinder bore 18. The piston 32 may be constructed of metal, plastic or any other suitable materials. The piston has a piston outer circumferential rim 37 on the circumference of said piston top. This piston rim 37 has a diameter that is larger than the inner diameter of a retaining ring 72 in the inner circumferential retaining ring groove 20 located near the bottom of the cylinder bore 18. The piston rim 37 limits the stroke of the piston by contacting the retaining ring 72. The piston 32 has an undersized piston-skirt 62 that acts as an extended lever on the piston and limits the pivoting of the piston when it is installed in the cylinder 22.

The top of the piston skirt 62 preferably contains a tapered section 56, which aids in the alignment of the piston 32 with the center of the cylinder 22 through the tapered section's contact with the retaining ring 72 when the piston is fully extended (activated). Likewise, the bottom of the piston skirt 62 preferably has an outwardly tapered section 58 that also aids in the alignment of the piston 32 with the center of the cylinder 22 when the piston is fully retracted (deactivated). These features assist in keeping the axis of the piston in alignment with the axis of the cylinder when the piston is extended or retracted, and they help to eliminate the need to bear against the cylinder bore 18 to facilitate alignment. The piston skirt 62 preferably has a circumference that is large enough keep the piston 32 in alignment with the cylinder 22 and small enough to allow the installation of the retaining ring 72 when the piston is being installed in the cylinder. Preferably, the diameter of the piston skirt (skirt diameter) 62 is no larger than the cylinder bore 18, minus two times the width of the retaining ring's 72 radial wall thickness, minus the depth of the retaining ring groove 20 in the cylinder. The piston skirt 62 does not come into contact with, or wear upon, the cylinder bore 18. The piston skirt 62 only comes into contact with the retaining ring 72, which is a durable component and is not a sealing surface. By eliminating contact of the piston with the cylinder bore 18 (the inner wall of the cylinder), the wear upon the cylinder bore that would otherwise occur from contact with the piston 32 or the piston skirt 62 is completely eliminated and the life of the cylinder's bore 18 and the piston-bore seal 40 are greatly improved.

The piston skirt 62 has an unconventionally large gap between the skirt and the cylinder bore 18. The large gap (illustrated in FIG. 4) allows the piston 32 and piston skirt 62 to be installed into the cylinder 22 in a highly pivoted orientation, which in turn allows for the use of seals with complex designs, such as highly compliant, over-sized sealing lips 41 and a wiper feature (wiper) 42, as illustrated in FIG. 5, in the preferred device. These types of seals cannot be used in systems that restrict wobbling (tilting or canting) of the piston 32 during assembly because the wiper feature 42 and the sealing lip 41 would become lodged in the retaining ring groove 20, if the piston 32 entered or exited the cylinder 22 with the seals parallel to the groove as is done in the prior art. Wipers 42 are desirable because they wipe contaminants from the surface of the cylinder bore 18 every time the piston 32 is activated and travels downward in the cylinder 22, specifically the cylinder bore 18.

The piston skirt 62 may be integrally formed with the piston to form a single piece, or it may be a separate modular component that can be attached to the piston 32 using conventional methods, such as a press fit or friction fit. By using a separate modular attachable piston skirt, different lengths of the piston skirt can adjust the total length of the piston 32 to accommodate various lengths of travel of the piston (or piston strokes) that may be desirable in conjunction with cylinders of various lengths.

In another preferred embodiment of the invention, the piston 32 has a removable piston skirt 62 that allows the piston to be rotated 360 degrees within the cylinder 22 during assembly. The skirt 62 may be attached to the piston after the piston has been inserted into the cylinder. This is not possible in the prior art devices shown in FIGS. 2 and 3. By employing removable piston skirt(s) that allow extensive rotation of the piston within the cylinder during assembly, an even wider range of seals and wipers may be used with the benefits that come with those seals and wipers. Additionally, by employing the use of removable piston skirts, the overall length of the piston can easily be altered to match the lengths of various cylinders, thus enabling the piston to have effective strokes of various lengths that may be desirable for various vehicles or various applications.

Returning to FIG. 1, preferably, the piston skirt 62 has a circular bottom flange 64 extending outwardly from the bottom of the piston skirt 62. This circular bottom flange 64 and the piston skirt 62 work in conjunction with the retaining ring 72 to keep the piston in proper alignment relative to the cylinder 22, while the piston 32 is extending or retracting within the cylinder 22. These components along with the cylinder's bore 18 also serve as a system of interlocking components to shield the cylinder bore 18 from dust and other contaminants, to reduce wear and improve the life of the cylinder bore 18, the piston-bore seal 40, and the piston skirt 62. The circular bottom flange 64 also provides added strength and rigidity to the piston skirt 62.

The piston 32 preferably has a coil spring flange 46 extending downwardly from the piston top to retain the coil spring C in the proper position relative to the bottom of the piston. This coil spring flange 46 preferably also has a bump stop flange 48 extending inwardly toward the shock absorber shaft to retain an elastomeric bump stop 10. This positioning of the bump stop enables it to move in tandem with the piston 32 and the top of the coil spring C as the piston is activated and deactivated.

In the presently preferred embodiment of the invention, the piston 32 has a circumferential groove (piston-bore seal groove) 35 that retains a piston-bore seal 40 to form an airtight seal between the piston 32 and cylinder bore 18. The piston-bore seal 40 may be located at the same level as the spring perch 36, or at a level that is higher or lower than the spring perch 36. The spring perch 36 rests on the top of the coil spring C. Ideally, the spring perch 36 is located as high as possible to minimize the height of the piston 32 that is situated on the top of the coil spring C.

The top rim of the piston preferably also has a reduced diameter relative to the rest of the piston due to a preferred outer circumferential inlet recess 34 that circles the top of the piston. The reduced dimension of the top rim of the piston provides several significant benefits.

The circumferential inlet recess 34 allows a pressurized fluid to enter and exit the cylinder port 14 faster and it also allows the piston to travel within the cylinder 22 without interfering with any fitting installed into the inlet port 14 when the fitting extends inward beyond the cylinder bore 18. This helps to minimize the added height to the top of the coil spring C compared to lift systems in the prior art and it also permits the use of a cylinder 22 with a smaller outer diameter to fit in vehicles with space limitations.

The presently preferred embodiment of the invention uses compressed air, however, other pressurized gases or fluids (mediums) may be used in the alternative.

The reduced dimension of the top of the piston increases the piston's 32 ability to wobble (cant or tilt) within the cylinder 22 to facilitate the installation and the removal of the piston 32 from the cylinder 22. See FIG. 4. Preferably, the piston 32 and the cylinder 22 are allowed to wobble-up to 5 degrees or more.

Figure 4:
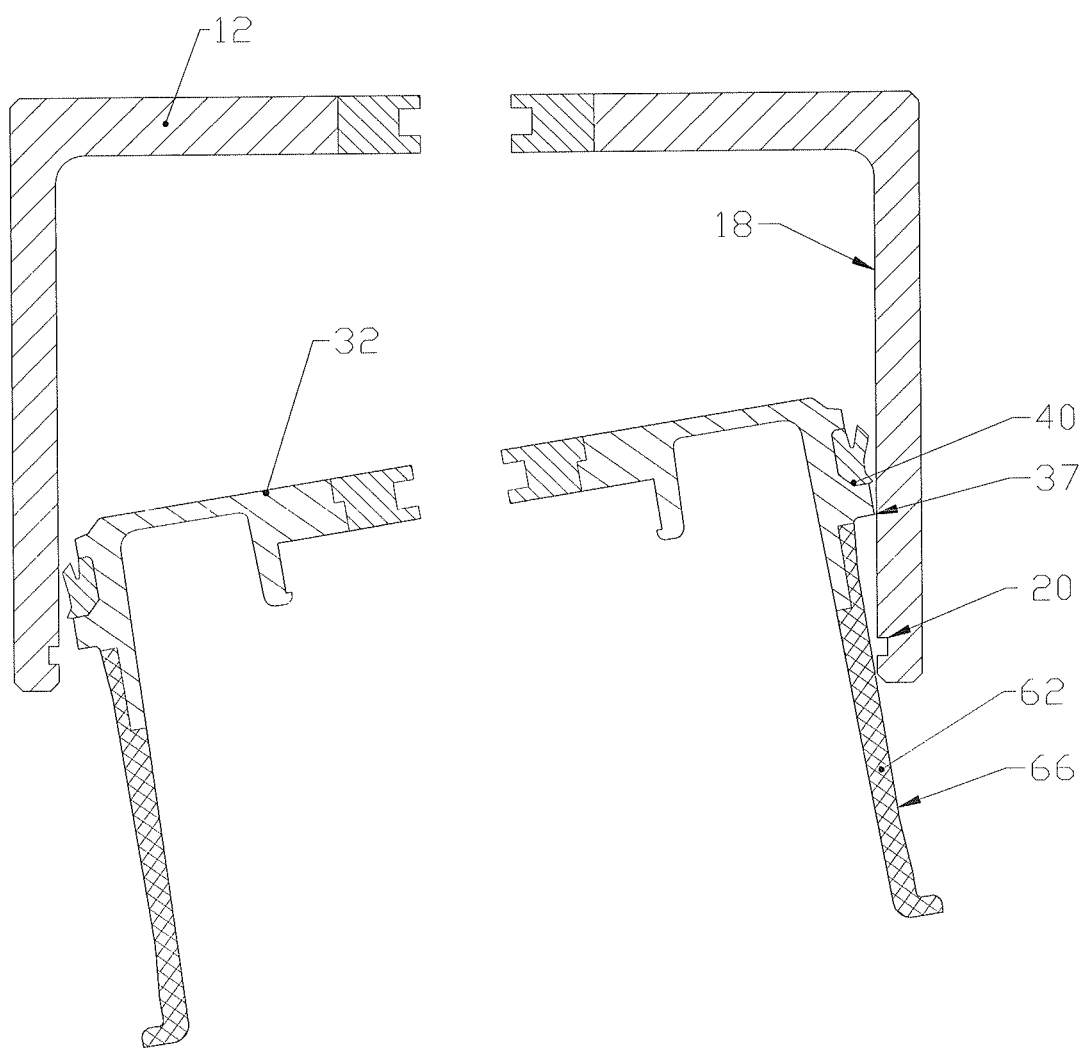
FIG. 4 is a cross-sectional view of an earlier version of the present invention (that is mounted on a shock absorber shaft) with the piston tilted in an off-axis orientation relative to the cylinder (wobbling within the cylinder) as it would be during assembly of the piston into the cylinder or disassembly of the piston out of the cylinder.
Figure 5:
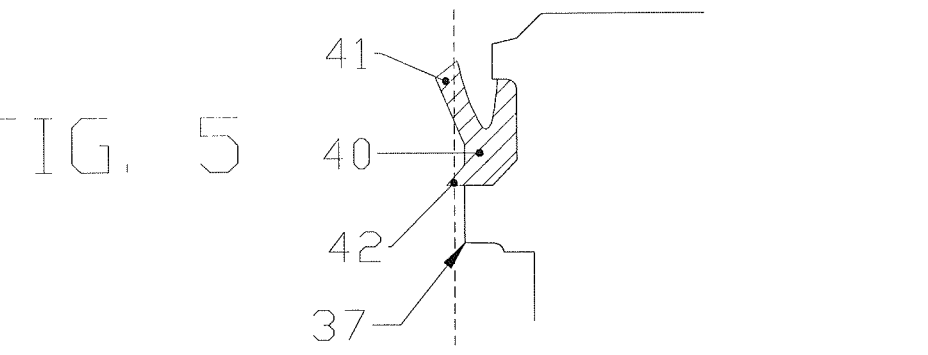
FIG. 5 is a cross-sectional view of the present invention's seal between the piston and cylinder bore (piston-bore seal).

FIG. 4 illustrates how the piston 32 of an earlier version of the present invention (that mounts on a shock absorber shaft) is able to wobble (or cant or tilt) relative to the cylinder 22 during assembly of the piston into the cylinder, due in part to: the piston skirt 62 having a diameter that is significantly smaller than the diameter of the cylinder bore and/or a removable undersized skirt, the cylinder not being double-walled, and the piston 32 having a reduced diameter at the top. FIG. 4 demonstrates how the piston-bore seal 40 can pass over the retaining ring groove 20 without being parallel to the groove. This greatly facilitates the use of seals 40 that have larger sizes and/or other features, such as over-sized sealing lips and/or wipers that would not be able to easily pass over the retaining ring groove 20 in the cylinder in a parallel orientation. The ability of the piston to wobble (or cant or tilt) within the cylinder, and to use seals that perform better, greatly improves the operation, durability, and reliability of the lifting apparatus in the present invention.

Without the ability for the piston 32 to wobble (or cant or tilt) within the cylinder, the piston-bore seal 40 would become lodged in the retaining ring groove 20 during installation or removal of the piston. The ability to tilt the piston 32 and piston-bore seal 40 out of parallel alignment with the retaining ring groove 20 allows the piston 32 and piston-bore seal 40 to pass over the retaining ring groove 20 without becoming lodged or damaged. The ability to wobble or cant the piston also allows for the use of piston-bore seals 40 with advantageous configurations and features, including over-sized upper sealing lips 41 and wiper features 42 (both shown in FIG. 5) that provide better sealing capabilities, clean the cylinder bore every time the piston is activated (when the piston 32 and cylinder 22 slide apart), greatly reduces the wear on the cylinder's bore, and increases the life of the cylinder and the bore seals. The wobbling (tilting or canting) allows for the use of such seals because without the wobbling, the seals would otherwise become lodged in the retaining ring groove 20 resulting in damage to the seals.

Referring to FIG. 1, the piston-bore seal 40 works in conjunction with the smooth surface of the cylinder bore 18 to form an airtight and expandable pressure space between the cylinder and the top of the piston. The retaining ring 72, inserted in the retaining ring groove 20, retains the piston 32 within the cylinder 22 by contacting the piston lower circumferential rim 37 and works in conjunction with the piston skirt 62 and upper 56 and lower 58 tapered sections of the piston skirt to maintain the alignment of the same relative to the vertical axis of the cylinder 22. The retaining ring 72 also serves as a barrier to keep dust and other contaminants away from the cylinder bore when the piston is in its retracted (deactivated) position.

Figure 2:
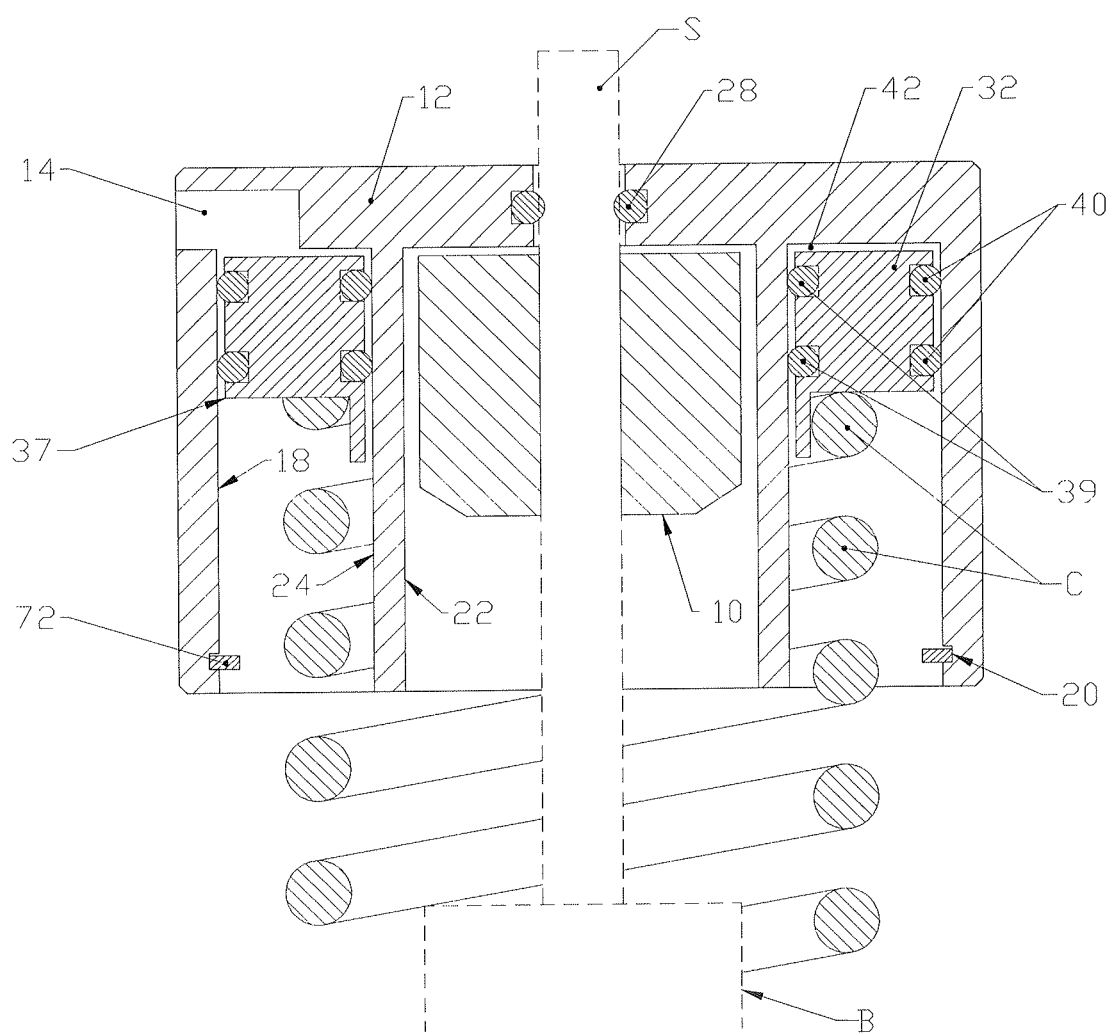
FIG. 2 is a cross-sectional view of a first prior art device, which contains a hollow double-walled cylinder with concentric inner and outer cylinder walls and a ring-shaped piston.

The presently preferred embodiment (as described above) provides significant benefits over the prior art. Referring to FIG. 2, shown is a prior art device that uses a conventional cylinder 12 with an outer cylinder bore (wall) 18, an inner cylinder bore (wall) 24 facing the piston 32, and an inner cylinder bore (wall) 22 facing the shock absorber shaft S. The inner cylinder bore (wall) 22 facing the shock absorber shaft S has a larger diameter than the shock absorber shaft S. The diameter of the inner cylinder bore 24 facing the piston 32 must be large enough to accommodate the thickness of the cylinder wall and any bump stop 10 and/or the shock absorber body B, as well as other component, such as a possible dust sleeve, which may interfere with the operation of the suspension system. During compression of the coil spring C, the shock absorber body B may move into the space within the inner cylinder bore (wall) 22 and thus the diameter of the inner cylinder bore (wall) 22 must be large enough to accommodate the size of the shock absorber body B.

Within the outer cylinder bore 18 and the inner cylinder bore 24 there is a ring shaped piston 32. This piston has inner seal(s) 39 that form an air tight seal against the inner wall 24 and outer seal(s) 40 that form an airtight seal against the outer cylinder bore 18.

Pressurized fluid or gas is introduced through the inlet port 14 to activate and press down upon the ring shaped piston 32. The annular area on the top of the piston 32 between the inner cylinder wall 24 and the outer cylinder wall 18 is the effective pressurized area. It is only in this area that pressure can be applied to the top of the piston, which then presses on the coil springs, to raise the cylinder 12 against the underbody of the vehicle. The effective pressurized area is substantially smaller than the effective pressurized area in the presently preferred embodiment of the invention (as shown in FIG. 1), which results in a lower lifting capacity for the prior art device in comparison to the present invention.

For example, in order to lift a 1,000 pound load on a single lifting device, the prior art requires a storage tank that has 8.247 times the capacity as the storage tank in the present invention. This assumes the controlled variables of a shock absorber with a 0.5" shaft, a cylinder bore with a 4.5 inch inside diameter (ID), piston stroke of 2 inches, tank air pressure at 120 PSI and a lift load of 1,000 pounds on a single cylinder.

EXAMPLE OF THE PRESENT INVENTION VS PRIOR ART

The present invention utilizes the 0.5" shock absorber shaft as its sealing surface (inner bore) while the prior art uses a 3" inner bore. It is able to lift 1,000 pounds with a tank size of approximately 0.154 Gallons. The prior art requires a tank size of 1.27 Gallons which is 824.7% of the present invention required tank size.

The present invention requires a tank size of 0.154 gallons to lift 1,000 pounds.

4.5" ID of cylinder
0.5" Shock Absorber Shaft diameter (serves as the inner bore)
120 PSI Tank Pressure
1,000 pounds Lift for a single cylinder
Tank Size Required: 0.154 Gallons Prior art system requires a tank size of 1.270 gallons to lift 1,000 pounds.

4.5" ID of cylinder
3" Inner bore of a conventional hollow cylinder example
120 PSI Tank Pressure
1,000 pounds Lift for a single cylinder
Tank Size Required: 1.270 Gallons The present invention can lift 1,702 pounds with a 1.270 gallon tank size.

Figure 3:
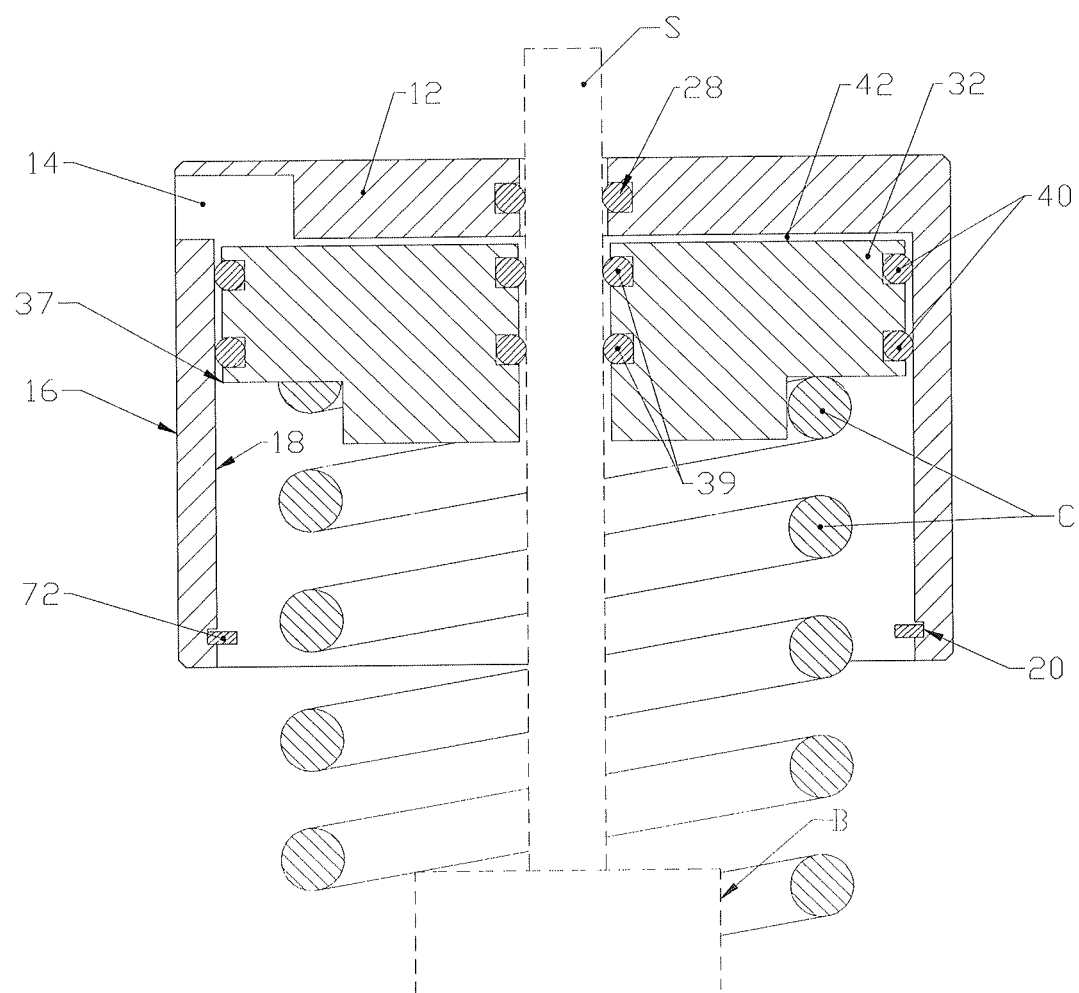
FIG. 3 is a cross-sectional view of a second prior art device.

4.5" ID
0.5" Shock Absorber Shaft diameter (serves as the inner bore)
120 PSI Tank Pressure
1,702 pounds Lift for a single cylinder
Tank Size: 1.27 Gallons FIGS. 2 and 3 illustrate the inner piston seals 39 and the outer piston seals 40 in the prior art devices. Due to limited available space for the seals and the coil spring C, the location, size, and design of the seals are restricted. To avoid interference between the seals and the coil spring C, the seals may be positioned above the coil spring as shown in FIGS. 2 and 3. As a result, the piston 32 must be thicker to accommodate the seals, and the top of the coil spring must be relocated to a lower position than in the present invention. This means that the ground clearance of the vehicle will not be as low as it could be. To offset this raising of the vehicle, the original coil spring C may need to be replaced with a shorter coil spring at an added cost and with reduced performance.

The pistons 32 used in prior art, as shown in FIGS. 2 and 3, are also restricted from wobbling (or canting) within the cylinder 12 to prevent the seals 39, 40 from losing contact with the cylinder bore 18 (in FIG. 2), and the outer cylinder bore (wall) 18 and an inner cylinder bore (wall) 24 facing the piston 32 (in FIG. 3), which would result in a leak and failure of the lift system. Thus, the pistons 32 are designed to be thick (and tall) enough to prevent excessive wobbling (or canting) within the cylinder. The walls of the cylinder are used to guide the piston and keep it in alignment with the cylinder. The pistons are also designed to fit more snugly into the cylinders than in the present invention. This also prevents the pistons from wobbling excessively. This arrangement makes it difficult or impossible to use seals that may become lodged in any grooves in the cylinder wall such the groove 20 for the retaining ring.

The pistons used in prior art also have outer circumference cylindrical surfaces that extend substantially in the longitudinal or axial direction, as illustrated in FIGS. 2 and 3. The length of the outer cylindrical surface must be long enough to maintain the axial alignment of the piston in the cylinder bore. In the present invention, illustrated in FIG. 1, the piston 32 uses an undersized piston skirt 62 that is much smaller in diameter than the piston top, much smaller than the piston lower circumferential rim 37 and much smaller than the cylinder bore 18 to help maintain axial alignment of the piston 32 relative to the cylinder bore 18. The top sealing section of the piston 32 is above the skirt 62 and it is shorter in the axial direction than the cylindrical outer surface of pistons used in prior art.

In the prior art, shown in FIGS. 2 and 3, the piston 32 cannot travel lower than the retaining ring 72, which limits the extension and stroke of the piston. In contrast, the piston skirt 62 in the presently preferred embodiment of the invention, shown in FIG. 1, can easily travel lower than the retaining ring 72. This means the piston has a longer effective stroke than the prior art devices. This longer stroke results in the ability to lift vehicles to a greater height than in prior art with a cylinder of the same axial length. Whereas a prior art cylinder would need to be longer to accommodate the thickness of the piston. Most cars, however, have space limitations that restrict the useable size of a suspension lifting device. The present invention uses a device that maximizes the stroke length of the piston within a given cylinder height so that the device can be effectively used in vehicles with space limitations.

Referring back to FIG. 1, the top of the coil spring C may extend higher than the piston-bore seal 40 without interfering with that piston-bore seal 40. This feature significantly reduces the thickness of the piston that rests on top of the coil spring C and therefore allows the vehicle to be at a lower ground clearance when the system is not active. This reduced thickness of the piston top eliminates or significantly reduces the need to replace the original coil spring C with a shorter coil spring to maintain proper normal vehicle height. It also significantly reduces the overall length, weight, and cost of the present invention's cylinder and piston assembly while providing added stroke length for the piston compared to the prior art shown in FIGS. 2 and 3.

The practical range for the thickness of the piston top in the presently preferred embodiment is approximately between 3 to 25 mm. Preferably, the thickness should be approximately in the range of 3 and 10 mm. Optimally, the thickness should be approximately in the range of 3 to 6 mm.

The prior art as shown in FIGS. 2 and 3 do not provide protection from contamination of the outer cylinder bore (wall) 18, the inner cylinder wall 24, the shock absorber shaft S, or the shock absorber shaft seal. There is no practical way to protect all of these surfaces without losing efficiency and/or lifting capability of the prior art system shown in FIG. 2. The lack of protection from contaminants results in added wear, shorter useful life of the components, lower reliability and higher maintenance costs than in my invention shown in FIG. 1.

Referring to FIG. 2, it is difficult or impossible to use a dust sleeve to protect the shock absorber shafts from contaminants without reducing the effective pressurized area to press upon the piston. The inner cylinder wall 22 occupies the space that would be needed by a dust sleeve unless the inner cylinder wall 22 was moved further away from the shock absorber shaft S. In order to accommodate the use of a bump stop and a dust sleeve that is large enough to fit over the shock absorber body B, the prior art's hollow cylinder inner wall surface 22 would need to be large enough to accommodate a dust sleeve within the inside diameter of the cylinder wall. This would greatly reduce the effective pressurized area over the ring shaped piston 32 and may render the piston 32 incapable of generating enough lifting force to raise the vehicle.

Figure 7:
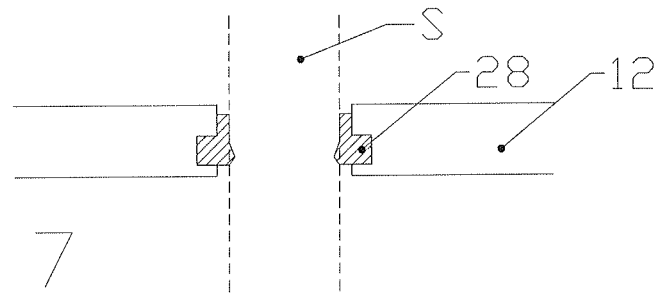
FIG. 7 is a cross-sectional view of the earlier version of FIG. 4's seal between the cylinder and the shock absorber shaft (cylinder-shaft seal).
Figure 8:
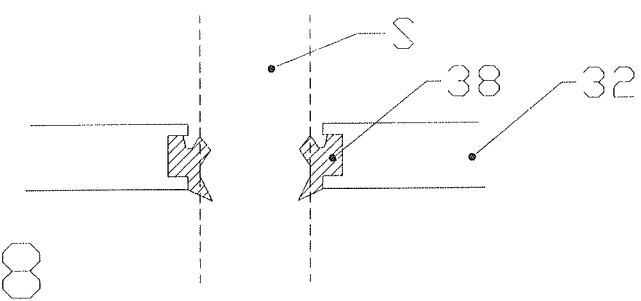
FIG. 8 is a cross-sectional view of the present invention's seal between the piston and shock absorber shaft (piston-shaft seal).

The piston-bore seal 40 used in the present invention, shown in FIG. 1 may be made of rubber, urethane or other commonly used seal materials. FIG. 5 illustrates a cross-sectional view of a presently preferred embodiment of a piston-bore seal 40. FIG. 7 illustrates cross-sectional view of a prior version of the invention (mounted on a shock absorber shaft) having a cylinder-shaft seal 28. FIG. 8 illustrates a cross-sectional view of the prior version having a piston-shaft seal 38.

Figure 6:
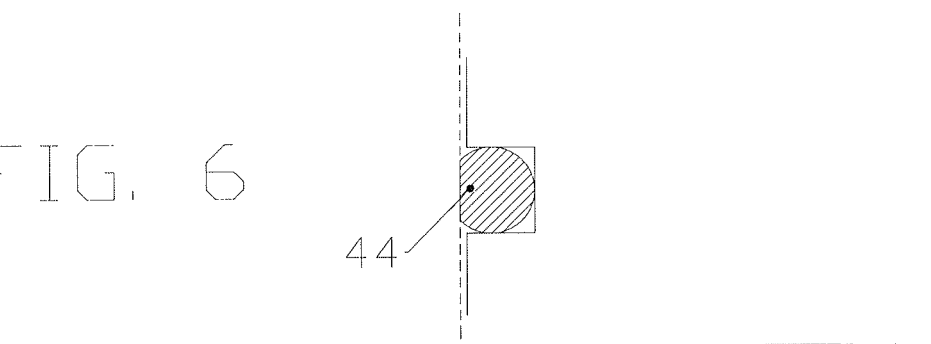
FIG. 6 is a cross-sectional view of a simple prior art piston-bore seal.

The piston-bore seal 40 in FIG. 5 has an upper sealing lip 41 with an over-sized dimension relative to the cylinder bore. This seal has better sealing capabilities than a simple seal, as illustrated in FIG. 6, especially if the piston is allowed to wobble (cant or tilt) within the cylinder. A seal with an oversized upper sealing lip 41 would become lodged in the retaining ring groove if it were inserted into a cylinder without tilting the piston and seal at an angle to the groove. The wiper 42 section of the seal in FIG. 5 serves to wipe contaminants from the cylinder bore when the piston is activated to move downward to raise the vehicle. This reduces the amount of contaminants on the cylinder bore that would otherwise contact the upper sealing lip 41. By wiping contaminants from the cylinder bore, the wiper 42 reduces wear on the bore and seal and prolongs the useful life of these components.

FIG. 6 illustrates a simple seal 44 that is typically used in the prior art devices shown in FIGS. 2 and 3. This type of seal is used because it can traverse over a groove in the cylinder, such as the retaining ring groove 20, without becoming lodged in the groove. However, this type of seal also has a number of shortcomings. As shown in FIG. 3, the simple seal would not seal well if the piston 32 were to wobble (cant) in relation to the cylinder bore 18. If the piston 32 were to wobble, the simple seal would lose contact with the cylinder's bore 18 and the seal would fail to maintain pressure. To prevent this failure, prior art systems restrict the wobbling of the pistons in the cylinder. This is accomplished in various ways, such as the use of double cylinder walls as illustrated in FIG. 2. The prior art also uses thick (tall or long) cylindrical piston designs that cannot wobble within the cylinder because of a close tolerance fit to the cylinder bore as shown in FIG. 3.

Another problem with simple seals 44 used in prior art (as illustrated in FIG. 6) is that they allow more contaminants to pass over the seal's sealing surface resulting in abrasion and damage to the seals and the cylinder bore. This type of seal does not have the ability to effectively wipe debris or contaminants from the cylinder bore 18 as does the seal with the wiper feature 42 illustrated in FIG. 5.

In the prior art, as shown in FIG. 2, the piston 32 is retained in alignment with the cylinder 12 by an outer cylinder bore (wall) 18 and an inner cylinder bore (wall) 24 facing the piston 32. This arrangement does not allow the piston to wobble (cant or tilt) once it is installed in the cylinder. This means that the piston seals 39, 40 remain parallel with any features in the cylinder walls 18, 24, such as the retaining ring groove 20, during assembly and dis-assembly of piston with the cylinder. Because the seals 39, 40 will enter and exit the cylinder in a position that is parallel with the retaining ring groove 20, they would tend to become lodged in the groove if they are large enough to do so. This can result in damage to the seals and it prohibits the use of seals with beneficial features, such as larger sealing lips with greater compression and/or compliance with the cylinder bore and better sealing capabilities. An example of a seal with beneficial design features is the use of wiper feature 42, as illustrated in FIG. 5, to clean the bore(s) and reduce wear of the inner and outer cylinder walls 18, 24 as illustrated in FIG. 2 and the seals 39, 40. Wiper seals would have wiper blades to wipe contaminants from the cylinder walls (bores).

Figure 10:
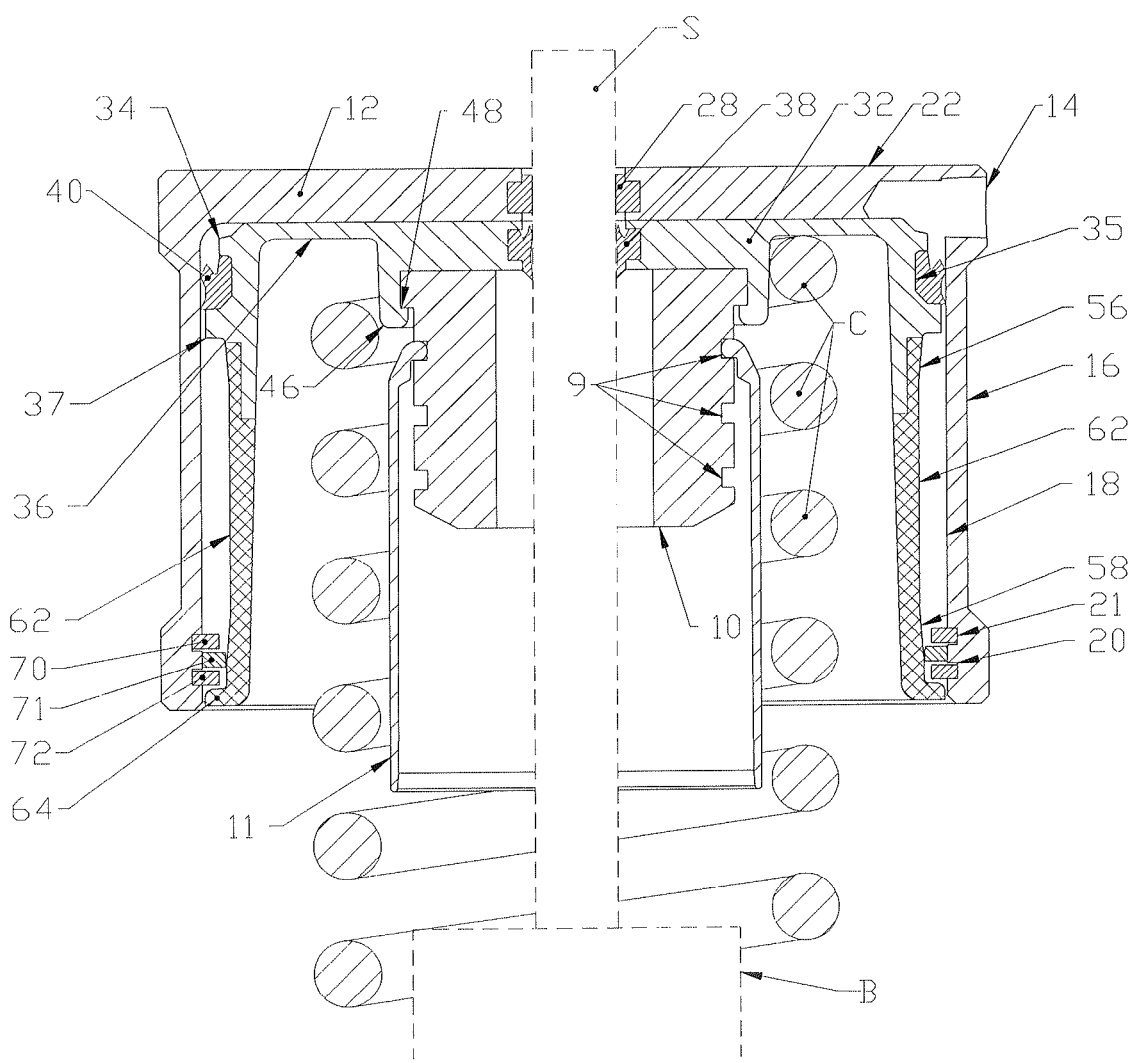
FIG. 10 is a longitudinal cross-sectional view of an alternate presently preferred embodiment of the invention.

FIG. 10 illustrates another presently preferred embodiment of the invention. In this embodiment, cylinder 22 has an upper retaining ring groove 21 and a lower retaining ring groove 20 located at the bottom of the cylinder bore 18. An upper retaining ring 70 is located in the upper retaining ring groove 21. A lower retaining ring 72 is located in the lower retaining ring groove 20. A guide ring 71 is located between the upper retaining ring 70 and the lower retaining ring 72. The guide ring 71 extends inwardly, farther than either the upper retaining ring 70 or lower retaining ring 72, so that it comes into contact with the undersized piston skirt 62 instead of the upper and lower retaining rings 70 and 72. The guide ring 71 is preferably made of Teflon or any other suitable smooth material.

The use of a smooth surfaced (Teflon) guide ring 71 is preferable because it is used to guide the piston skirt 62 instead of the hard (metal) retaining rings 70, 72. This reduces wear on the piston skirt 62, thus prolonging the life of the piston skirt 62 and reducing repair and/or replacement costs.

Figure 11:
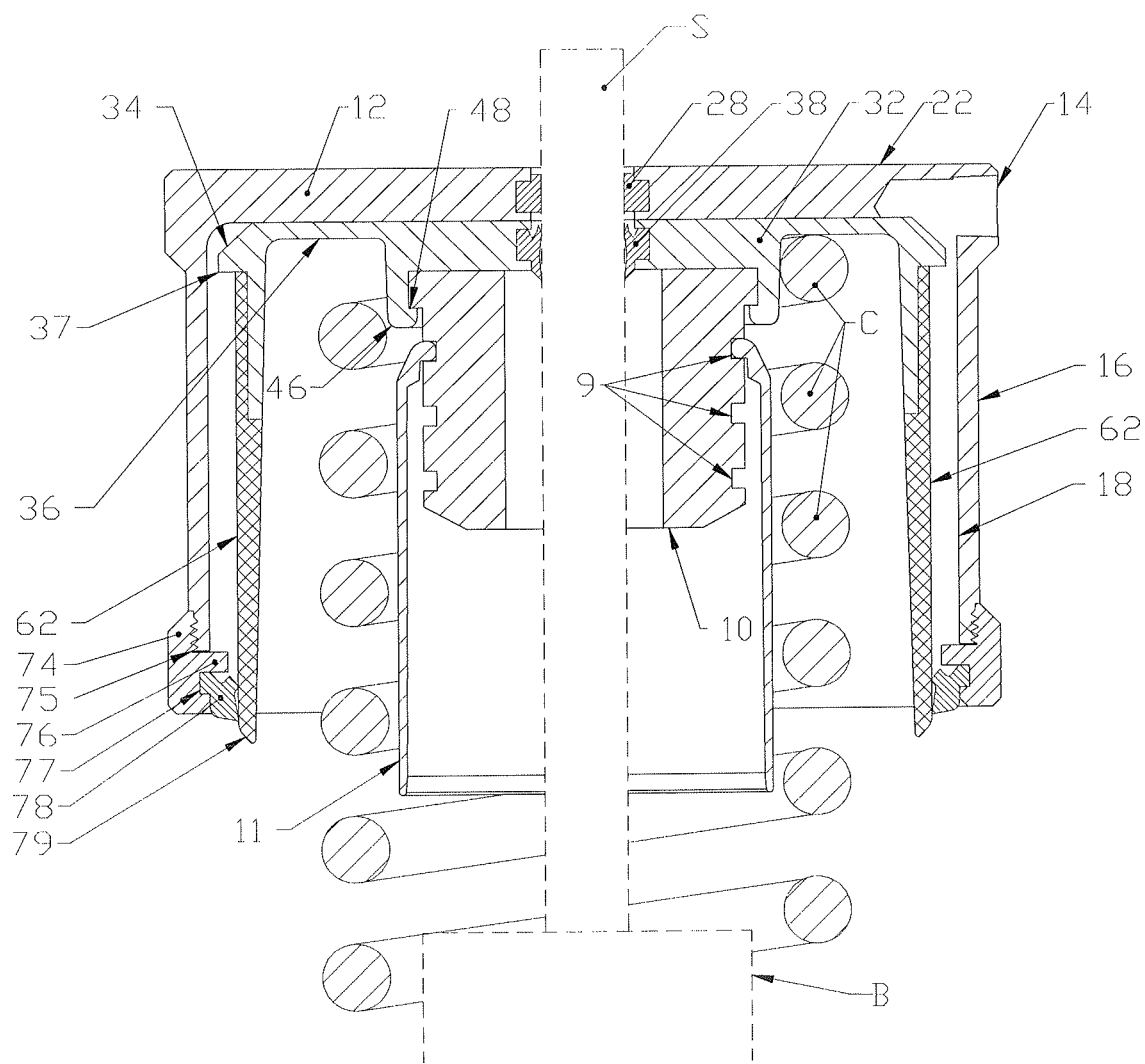
FIG. 11 is a longitudinal cross-sectional view of another alternate presently preferred embodiment of the invention.

FIG. 11 illustrates another presently preferred embodiment of the invention. The piston 32 has a circumferential piston rim 37 at the top of the piston 32 to serve as a positive stop that limits the travel of the piston 32 in the cylinder 22. The piston 32 has an undersized piston skirt 62 that is smooth and straight (not tapered). The piston skirt 62 is undersized relative to the cylinder bore 18 sufficiently to prevent the piston skirt from touching the cylinder bore. The piston circumferential rim 37 has a larger diameter than the undersized piston skirt 62. The piston skirt 62 is attached to the piston top and extends downward preferably to the bottom of the cylinder. The piston skirt 62 is guided by the piston seal 78. The piston skirt is attached to the top of the piston 32 below the piston circumferential rim 37, and the piston skirt serves as an extended lever attached to the piston to prevent excessive tilting of the piston. The piston circumferential rim 37 prevents the piston from tilting excessively in the cylinder bore 18. The piston circumferential rim 37 also prevents the undersized piston skirt 62 from touching the cylinder bore 18, thus protecting the piston skirt 62 from wear and damage from any contact with the cylinder bore. The piston skirt 62 also protects the cylinder bore from environmental contaminants such as dust, mud, water, sand and snow. The piston skirt 62 does not limit the travel of the piston within the cylinder bore 18 because it is sized substantially smaller than the cylinder bore and it can travel beyond the bottom of the cylinder.

A cylinder ring 74 is attached to the bottom of the cylinder side walls through conventional methods, such as screw threads 75 in the cylinder ring 74 and the bottom of the cylinder 12. The cylinder ring 74 has a cylinder retaining ring flange 76 that extends inward to limit the travel of the piston 32, by engaging lower surface of the piston circumferential rim 37. The cylinder ring 74 has a cylinder ring groove 77 to retain a cylinder ring seal 78. The cylinder ring seal 78 preferably forms an air-tight seal between the cylinder ring 74 and the piston skirt 62. The bottom edge of the piston skirt (at the skirt bottom) preferably has a taper 79 to facilitate the assembly of the cylinder ring seal 78 over the bottom edge of the piston 79.

Figure 12:
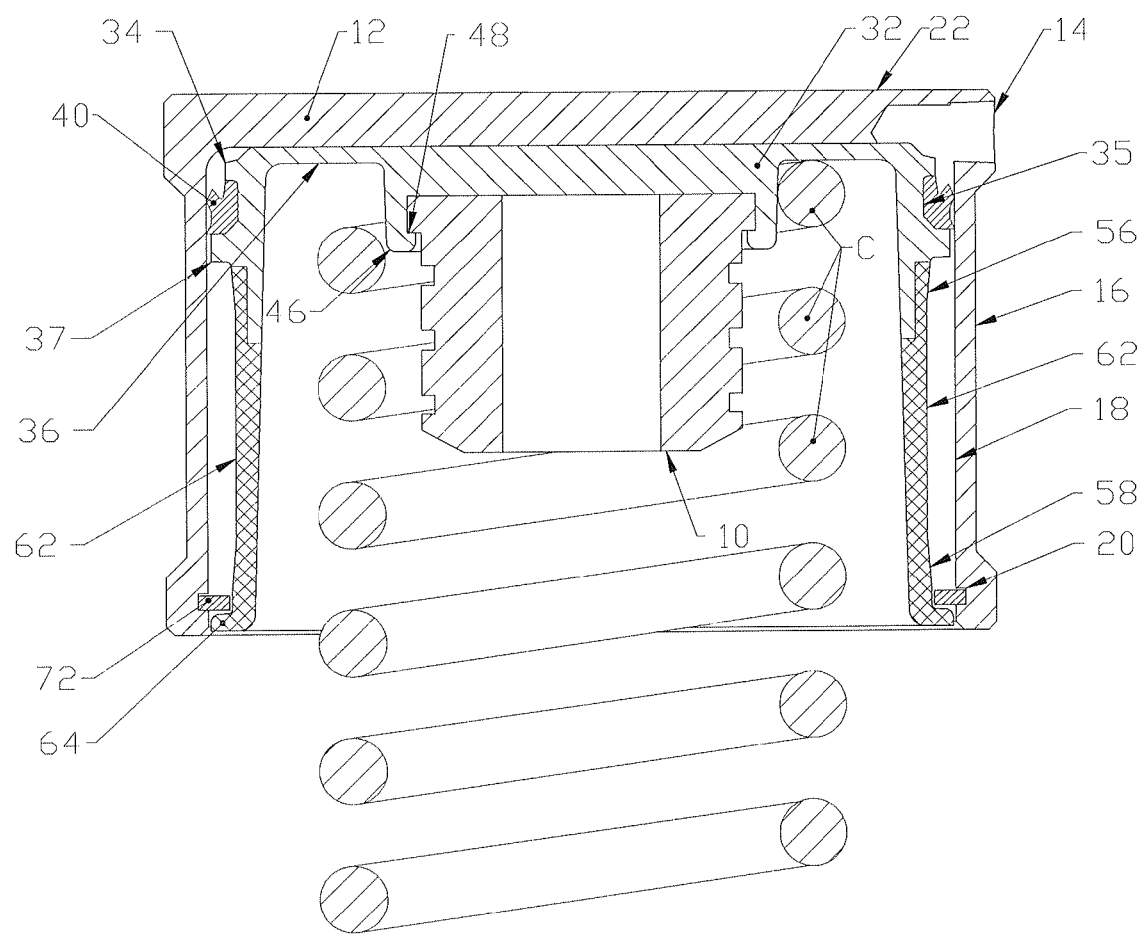
FIG. 12 is a longitudinal cross-sectional view of another alternate presently preferred embodiment of the invention.

FIG. 12 illustrates a variant of the preferred embodiment shown in FIG. 1. In this variant, the device is used with a coil spring without a shock absorber. The cylinder 22 and the piston 32 both have solid tops without apertures or seals, whereas the preferred embodiment illustrated in FIG. 1 shows apertures and seals in the centers of the cylinder 22 and the piston 32. Furthermore this variant of the preferred embodiment illustrated in FIG. 12 does not have a dust shield 11 as shown in the embodiment illustrated in FIG. 1.

Figure 13:
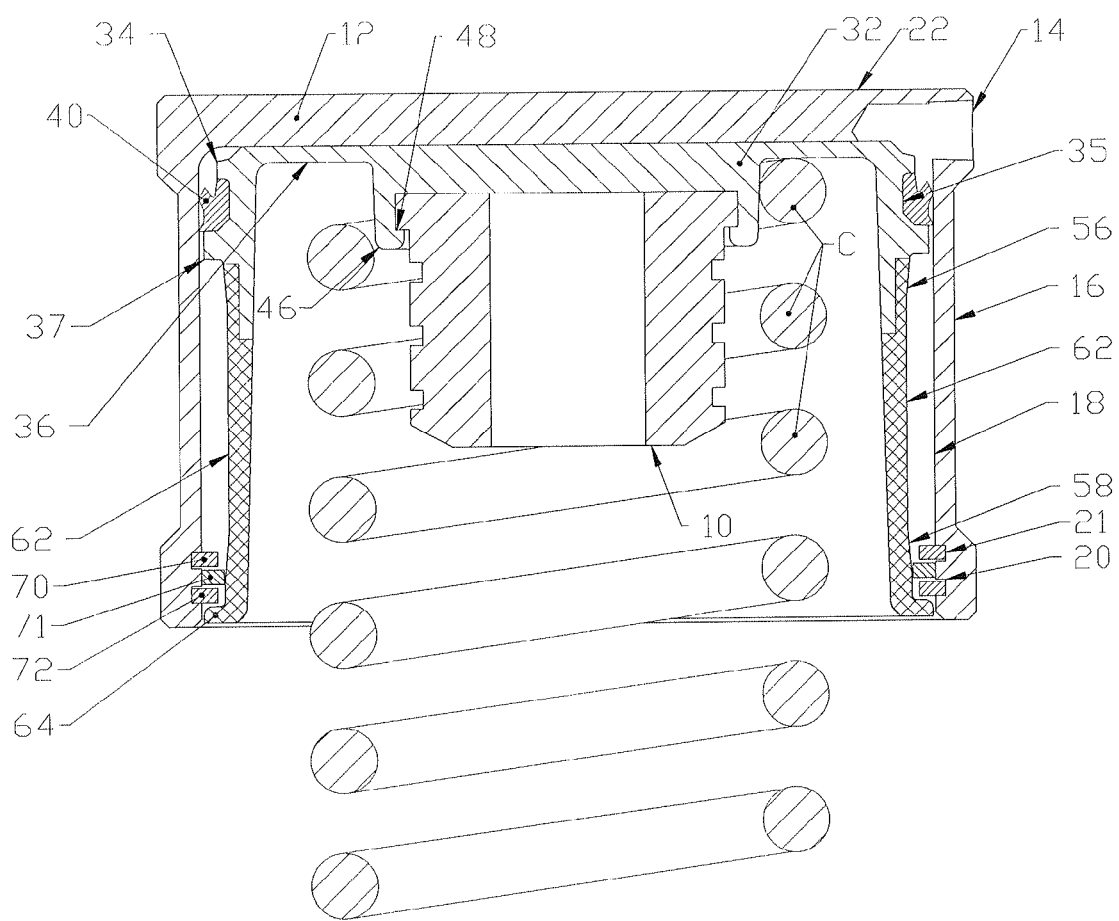
FIG. 13 is a longitudinal cross-sectional view of another alternate presently preferred embodiment of the invention.

FIG. 13 illustrates a variant of the preferred embodiment shown in FIG. 10. In this variant, the device is used with a coil spring without a shock absorber. The cylinder 22 and the piston 32 both have solid tops whereas the preferred embodiment illustrated in FIG. 10 shows apertures and seals in the centers of the cylinder 22 and the piston 32. Furthermore this variant of the preferred embodiment illustrated in FIG. 13 does not have a dust shield 11 as shown in the embodiment illustrated in FIG. 10.

Figure 14:
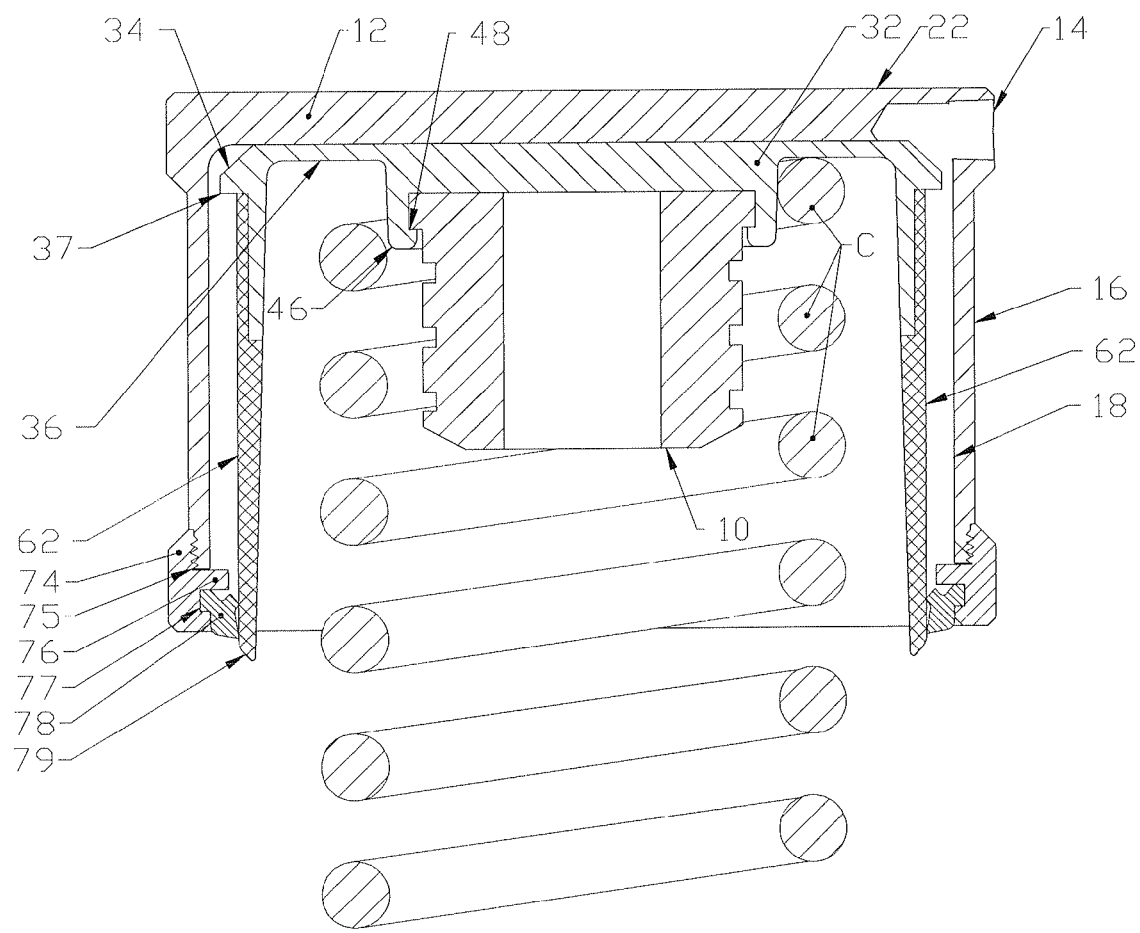
FIG. 14 is a longitudinal cross-sectional view of another alternate presently preferred embodiment of the invention.

FIG. 14 illustrates a variant of the preferred embodiment shown in FIG. 11. In this variant, the device is used with a coil spring without a shock absorber. The cylinder 22 and the piston 32 both have solid tops whereas the preferred embodiment illustrated in FIG. 11 shows apertures and seals in the centers of the cylinder 22 and the piston 32. Furthermore this variant of the preferred embodiment illustrated in FIG. 14 does not have a dust shield 11 as shown in the embodiment illustrated in FIG. 11.

Figure 15:
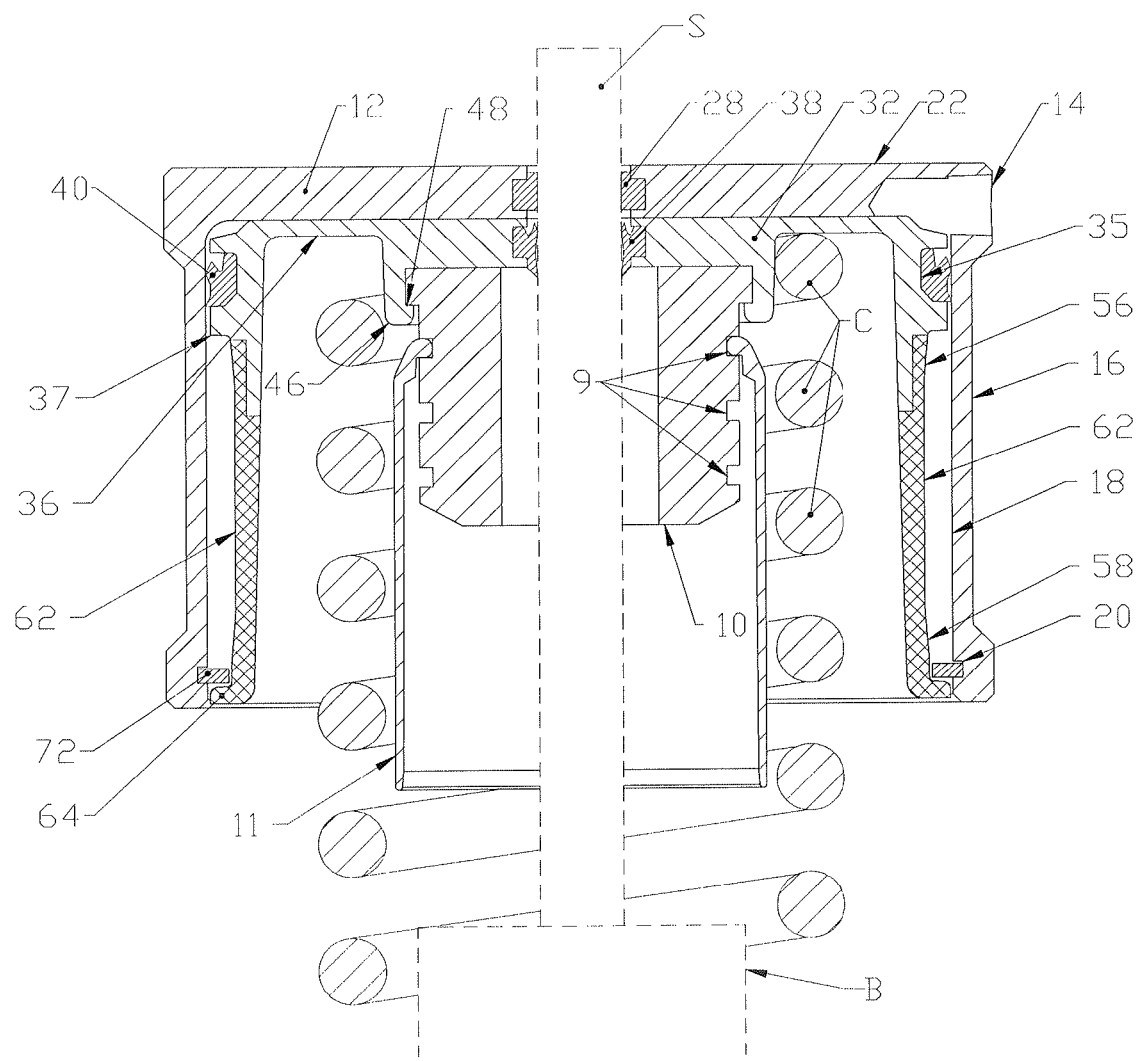
FIG. 15 is a longitudinal cross-sectional view of another alternate presently preferred embodiment of the invention.
Figure 16:
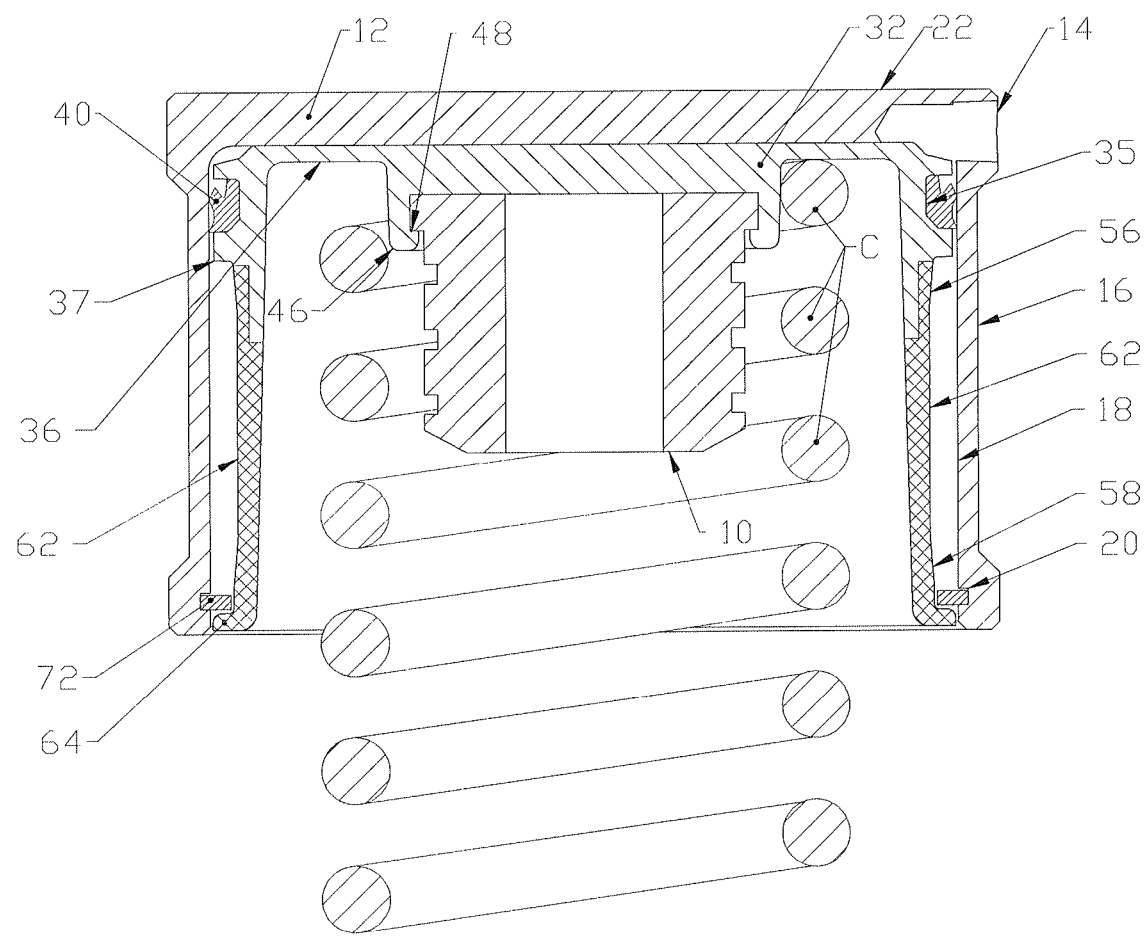
FIG. 16 is a longitudinal cross-sectional view of another alternate presently preferred embodiment of the invention.
Figure 17:
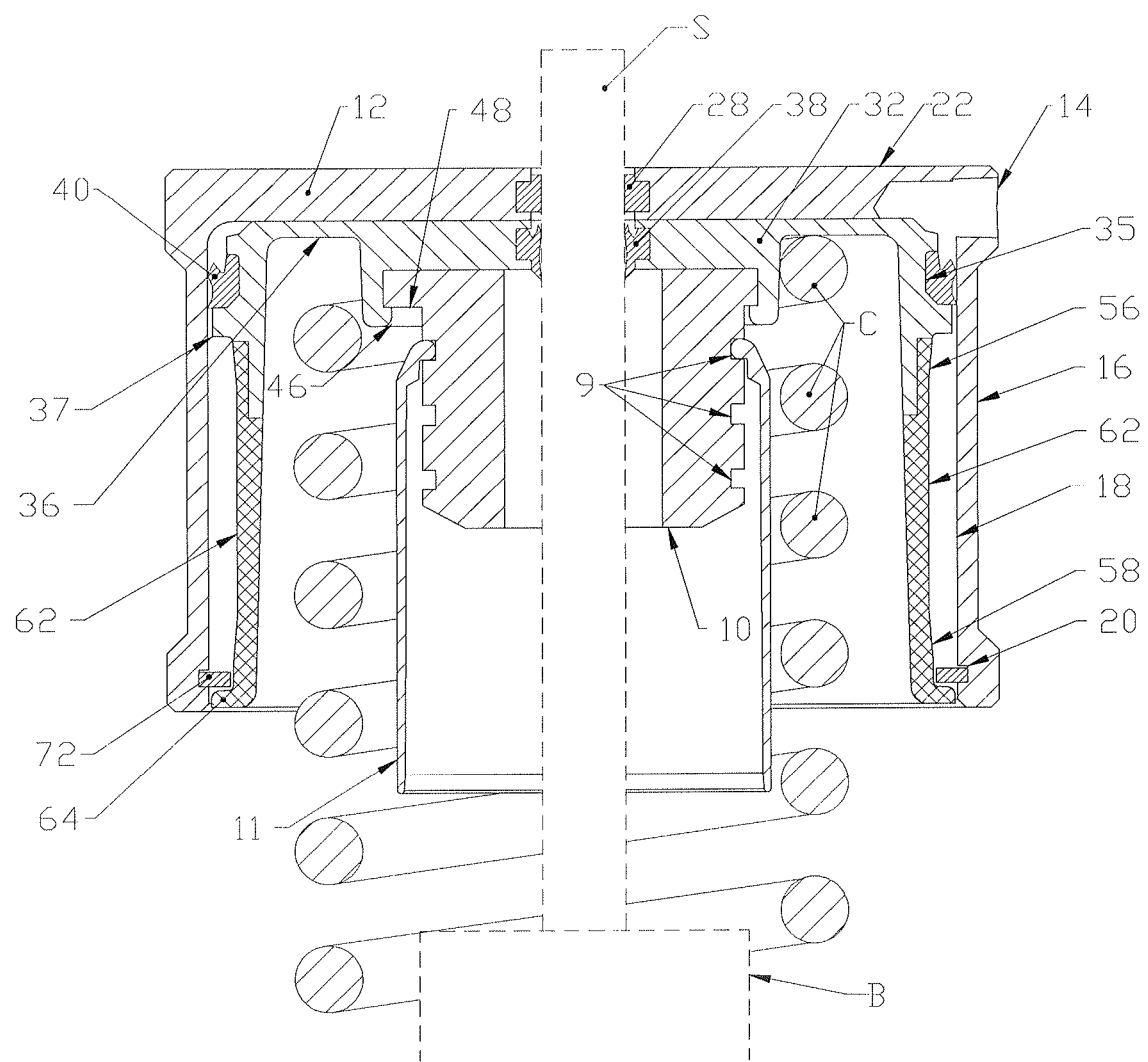
FIG. 17 is a longitudinal cross-sectional view of another alternate presently preferred embodiment of the invention. In this embodiment the coil spring C is located off-centered relative to the center of the other components.
Figure 18:
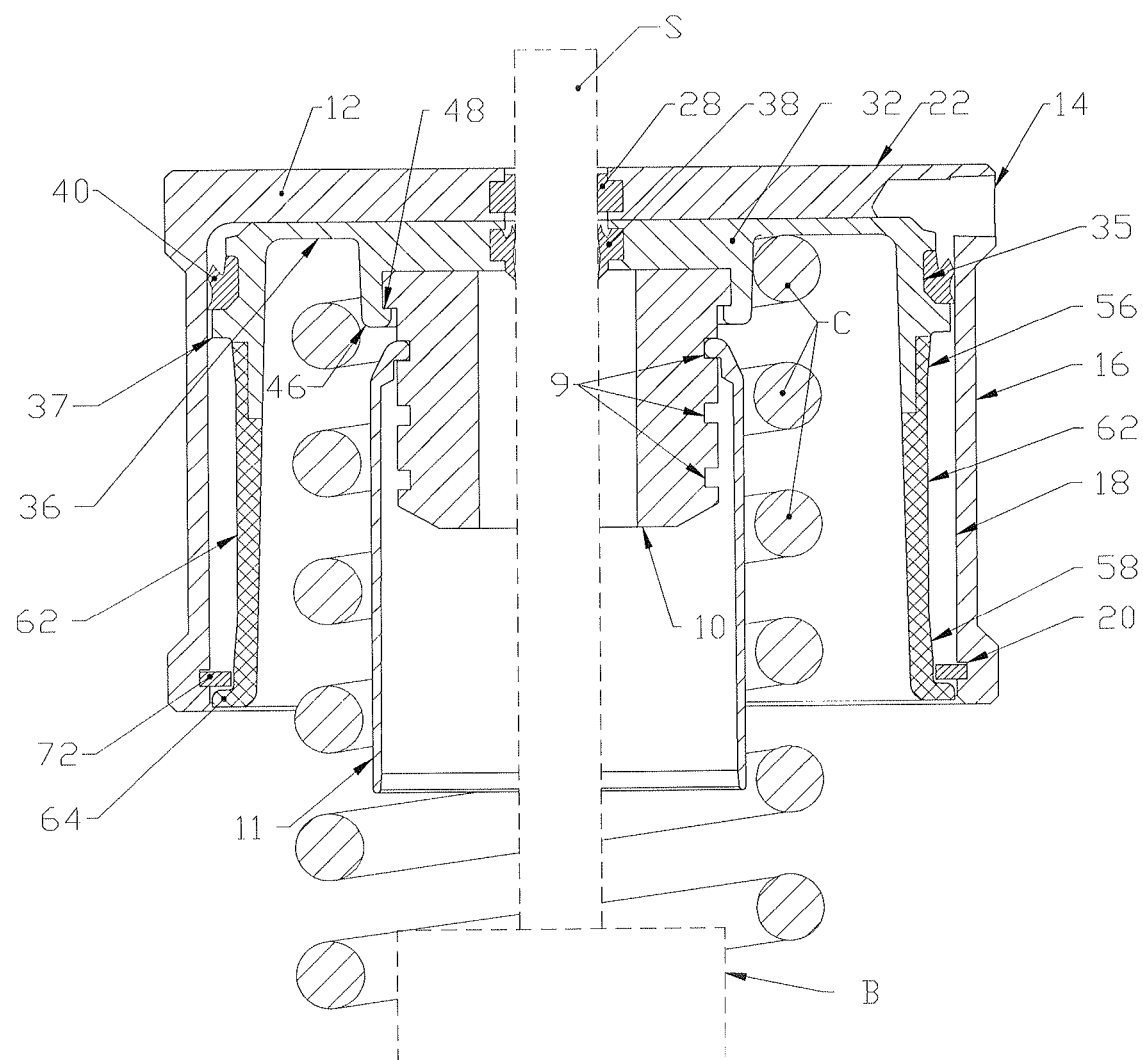
FIG. 18 is a longitudinal cross-sectional view of another alternate presently preferred embodiment of the invention. In this embodiment, the shock absorber shaft S, the cylinder shaft seal 28, the piston shaft seal 38 and the coil spring C are off-centered relative to the centers of the cylinder 22 and the piston 32.

FIGS. 15 and 16 illustrate variants of the preferred embodiment shown in FIGS. 1 and 12. In FIGS. 15 and 16, the top of the piston 32 is shown with a diameter that is smaller than the cylinder bore 18, but not as small as the variant shown in FIG. 1. The outer top rim of the pistons in FIGS. 15 and 16 are larger in comparison to the reduced diameter of the piston lower circumferential rim 34 illustrated in FIG. 1. Therefore the embodiments shown in FIGS. 15 and 16 do not provide the benefits of improved air flow into the device and they do not provide additional clearance for any fitting that might be installed into the inlet port 14. The piston 32 in FIG. 15 illustrates an embodiment with a shock absorber shaft S and FIG. 16 illustrates an embodiment without a shock absorber shaft.

Referring to FIGS. 1, 10, 12, 13, 15, 16, 17 and 18, a piston 32 is positioned inside the cylinder 22 and is proportioned for travel within the cylinder bore 18. The piston 32 is situated at the top of the coil spring C. The piston 32 has a piston lower circumferential rim 37 on the piston's circumference under a piston-bore seal 40.

For installations where the device is mounted at the top of a coil spring and a shock absorber as illustrated in FIGS. 1, 10, 15, 17 and 18, the device preferably has aperatures in the tops of the cylinder 22 and the piston 32 with a cylinder seal 28 and a piston seal 38 mounted in said apertures, for sealing against a shock absorber shaft S. Alternatively, for use in installations with a coil spring C but with no shock absorber, or where the shock absorber is mounted separately and away from the coil spring as illustrated in FIGS. 12, 13 and 16, the cylinder 22 and the piston 32 can have solid tops with no apertures and no seals.

In FIGS. 1, 10, 12, 13, 15, 16, 17 and 18, a circumferential retaining ring groove 20 is located at the bottom of the bore 18 and a retaining ring 72 is retained in the retaining ring groove. The retaining ring 72 limits the stroke of the piston 32 by stopping the stroke of the piston when the piston lower circumferential rim 37 contacts the retaining ring 72.

An undersized piston skirt 62 is attached to the piston top below the piston lower circumferential rim 37. The outer diameter of the piston skirt 62 is smaller than the inner diameter of the retaining ring 72. The outer diameter of the piston skirt 62 is substantially smaller than the diameter of the cylinder bore 18.

The retaining ring 72 also serves as an alignment ring that keeps the piston 32 and the piston skirt 62 in alignment with the axis of the bore 18 of the cylinder 22 and does not allow excessive tilting of the piston 32 and the piston skirt 62 within the bore 18. The use of the undersized piston skirt 62 and a retaining ring 72 as an alignment system allows the use of a very short piston top that would not function as well without the undersized piston skirt 62. If a piston top with a short length did not use the undersized piston skirt 62 to keep it in alignment with the axis of the bore, the piston top could tilt out of alignment with the axis of the bore 18 and the piston 32 could scrape against the bore 18 causing damage to the bore. The piston 32 could also become seized in the bore 18 unless the piston were long enough to prevent tilting and/or seizing. Also, the piston-bore seal could leak if the piston were allowed to tilt excessively.

It is desirable to have a short piston top because the length of the piston top limits the piston stroke within the cylinder and also limits the resulting lift that the piston can provide for the vehicle. Furthermore, short piston tops can accommodate longer suspension springs than a tall piston top. This is important because the shorter piston tops allow for a wider range of spring lengths for increased suspension travel and better suspension performance.

The undersized diameter of the piston skirt 62 allows the piston skirt to travel within the cylinder's bore 18 without touching the bore. The undersized piston skirt 62 does not cause any wear on the cylinder bore 18 because it is undersized sufficiently to not touch the bore 18. The undersized piston skirt 62 protects the bore of the cylinder from damage that could happen when a piston tilts excessively, making contact with and causes wear and damage to the bore 18.

The undersized piston skirt 62 does not limit the travel of the piston because it is sufficiently smaller than the retaining ring 72 to allow the piston skirt 62 to travel out past the retaining ring 72 and beyond the bottom of the cylinder. The retaining ring 72 does not retain the piston skirt 62 within the cylinder 22, but it does retain the piston lower circumferential rim 37 and the piston 32 inside the cylinder.

The piston skirt 62 protects the cylinder bore 18 from dirt and contaminants that would accumulate in the bore if the piston did not have the undersized piston skirt 62 and the bore were left exposed. The piston skirt preferably has a bottom flange 64 extending outwardly below the retaining ring 72. The piston skirt 62, the retaining ring 72, the piston skirt's bottom flange 64 and the cylinder bore 18 act together as a system of interlocking barriers to prevent contaminants such as dirt, mud, water, sand and snow from collecting onto the cylinder bore 18, thus eliminating the damage and wear that would otherwise occur to the bore 18 and the piston-bore seal 35 when the piston 32 slides within the cylinder bore 18.

The weight of the vehicle is transferred through the cylinder 22 to the piston 32 then to the coil spring C. The coil spring C may press against the piston spring perch 36 unevenly due to the spring's movement and the geometry and movement of the vehicle's suspension components. When the spring presses against the piston's spring perch 36 unevenly, the forces tend to tilt the piston out of alignment with the cylinder's bore 18. Excessive tilting of the piston 32 could result in the piston seal 40 leaking and/or the piston making contact with and scraping the cylinder bore 18. The piston skirt 62 located at the bottom of the piston 32 provides a lever arm to maintain the alignment of the piston 32 and the piston seal 40 at the top of the piston. Thus, the undersized piston skirt 62 prevents excessive tilting of the piston 32 without the need to use tall pistons and multiple seals, as used in prior art and illustrated in FIGS. 2 and 3.

FIG. 11 illustrates an alternative preferred embodiment for a device for adjusting the height of a vehicle that utilizes an undersized piston skirt 62 that does not come into contact with the cylinder bore 18. Preventing contact between the cylinder bore 18 and the piston skirt 62 results in less wear upon the cylinder bore 18 and the piston skirt 62 resulting in longer life of these parts and less cost for repairs. The piston 32 has a circumferential rim 37 that is sized to slide within the cylinder bore 18 and to engage a retaining ring 76 located at the bottom of the cylinder 16. During assembly, the piston 32 can tilt within the cylinder bore 18 until the cylinder ring 74 and the cylinder ring seal 78 are installed onto the cylinder 16. Once the cylinder ring 74 and cylinder ring seal 78 are installed, they form an air-tight seal with the undersized piston skirt 62 and maintain adequate alignment of the piston 32 within the cylinder 12.

The undersized piston skirt 62 is sized sufficiently smaller than the piston circumferential rim 37 so that the piston skirt can slide through the inside diameter of the retaining ring 76. The undersized piston skirt 62 is sufficiently smaller than the cylinder bore 18 to not touch or cause any wear or damage upon the cylinder bore.

The spring C presses against the piston's spring perch 36. This force from the spring may be uneven and it could excessively tilt the piston in prior art devices illustrated in FIGS. 2 and 3. Uneven pressure from the coil spring C on the bottom of the piston 32 in prior art devices can cause the piston to tilt excessively and scrape the cylinder bore 18, causing damage to the bore and to the seals 40. The device illustrated in FIG. 11 solves this problem by having the seal 78 at the bottom of the cylinder 16 and a circumferential piston rim 37 at the top of the piston and an undersized piston skirt 62 that maintains sufficient alignment of the piston 32 in the cylinder 22. As uneven force presses against the piston's spring perch 36, the piston's outer circumferential rim 37 at the piston top, located at the opposite end of the piston skirt from the seal 78, the piston skirt 62 and the piston seal 78 prevent the piston from tilting excessively.

In this device, the undersized piston skirt 62 is the sealing surface that seals against the piston seal 78. The piston skirt is sized proportionately to allow it to slide within the cylinder bore without touching the cylinder bore or any other component except the seal 78. By avoiding contact with any component other than the piston seal 78, the undersized piston skirt 62 in this embodiment does not experience any wear from contact with such components.

The undersized piston skirt 62, the cylinder 16, the cylinder ring 76 and the seal 78 form a system of barriers to protect the device from environmental contaminants such as dust, water, mud, sand and snow.

The cylinder ring 74 may be made in various lengths to provide a means of easily altering the length of the cylinder 12 and cylinder ring 74 assembly. Likewise, the cylinder 12 may be made in various lengths to alter the length of the cylinder 12 and cylinder ring 74 assembly. By altering the length of the cylinder 12 and the cylinder ring 74 assembly, the stroke of the piston 32 within the cylinder 12 can altered to achieve various stroke lengths.

The cylinder ring 74 may be made in any length and may effectively replace the cylinder side walls. Likewise, the cylinder 12 may be made in any length and may be so short that the cylinder side walls are effectively replaced by the cylinder ring 74 with adequate length to provide adequate stroke length for the piston 32.

FIG. 14 illustrates a variant of the preferred embodiment shown in FIG. 11. In this variant, the device is used with a coil spring without a shock absorber. The cylinder 22 and the piston 32 both have solid tops whereas the preferred embodiment illustrated in FIG. 11 has apertures and seals in the centers of the cylinder 22 and the piston 32. Furthermore this variant of the preferred embodiment illustrated in FIG. 14 does not have a dust shield 11 as shown in the embodiment illustrated in FIG. 11.

Activation of the Lifting System, Manual Buttons, Cruise Control Buttons and Automated Activation Referring to FIG. 1, in the presently preferred embodiment of the invention, the piston 32 is activated by the introduction of a pressurized fluid, such as compressed air, through the inlet port 14. The pressurized air activates the device by pushing the piston 32 downward and the cylinder 12 upward (the piston and cylinder slide apart). The force of the cylinder being pushed upward raises the vehicle when the force is great enough to overcome the weight of the vehicle. When the device is deactivated, the pressurized fluid (preferably air) rushes out of the inlet port 14 and the piston 32 and cylinder 12 return to their resting position adjacent to each other (the piston and cylinder slide together).

Figure 9:
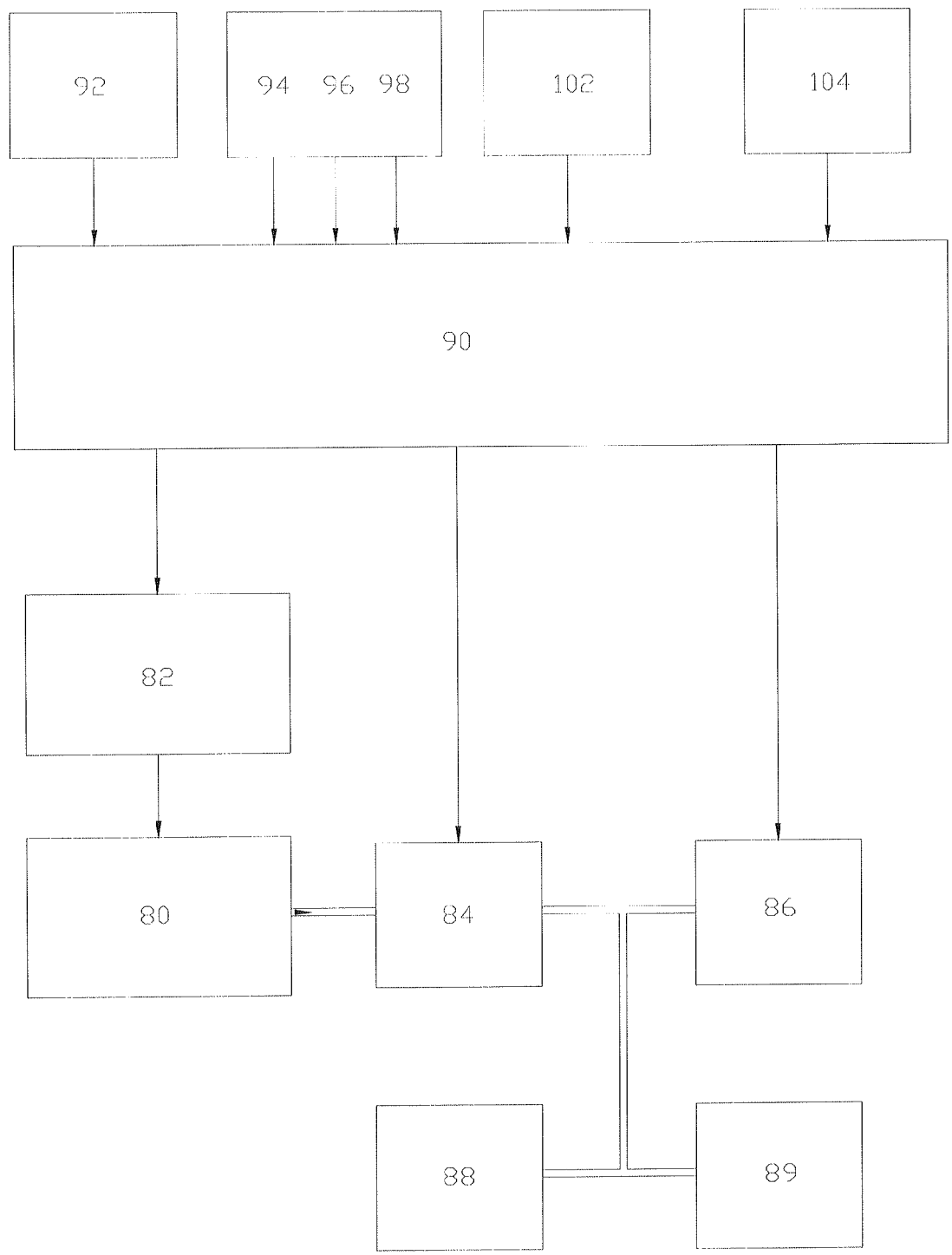
FIG. 9 is a flow diagram of how the present invention operates through the use of an Electronic Control Unit (ECU), sensors and other controls.

FIG. 9 shows a flow diagram of the lift system. First a compressor pump 82 generates compressed air that is stored in a storage tank 80. The compressed air is released from the storage tank 80 into the cylinder and piston assemblies 88 and 89 preferably for two or four wheels through the opening of one or more up valve(s) 84 to raise the vehicle, at preferably either two wheels or four wheels. To lower the vehicle back to its normal state, a down valve 86 is opened to release the air from the cylinder and piston assemblies.

The up valve(s) 84 and the down valve(s) 86 may be activated by various means such as manual switches or controls. In a presently preferred embodiment, a Control Unit, preferably an Electronic Control Unit (ECU) 90 is employed. The ECU receives inputs from various sources such as proximity sensor(s) 102 and a speed sensor 104 and from push button(s) 92 and cruise control buttons 94, 96 and 98, which are preferably controlled by an operator or a driver. The proximity sensor preferably is a ground clearance sensor that senses, monitors or calculates ground clearance. Ground clearance sensor is defined as a device with the means to measure ground clearance, calculate present or future ground clearance, estimate ground clearance or provide a signal or data which can be used in whole or in part to calculate or estimate present or future ground clearance. Ground clearance sensors may include proximity sensors, ultrasonic sensors, infrared sensors, capacitive discharge sensors and photo optic devices. The push button(s) 92, and cruise control buttons 94, 96 and 98 may be the Original Equipment Manufacturer (OEM) cruise control buttons and/or they may be any combination of any OEM button(s) or after-market button(s). The push buttons may also be rocker switches, or push button type switches or any other type of switch. They may have LED or other lights that display one or more colors to indicate status or for basic illumination. The lights may be lit constantly or pulsed at various frequencies to indicate the status of various functions and/or settings, or to provide feedback to the user when setting parameters to the control system. Additional feedback is optionally provided to the driver through audible devices, such as buzzers or speakers, which can be varied in their tone and/or volume to indicate such things as the status of the operation of the system or confirmation of commands to the system.

The invention may be installed on the front wheels only or on the front and rear wheels of vehicles. The front and rear devices may be activated simultaneously, or independently from each other. They may also be activated with a delay between the front and rear devices.

Many vehicles have existing switches or OEM cruise control systems with press buttons that are located on or near the steering wheel to safely activate a vehicle's cruise control system. These buttons can be safely activated without the need for a driver to take his eyes off the road to look for the buttons because they are easily accessible at or near a driver's fingertips. These OEM cruise control systems typically do not operate at slower vehicle speeds because cruise control systems are intended to be used at highway speeds. Thus, these systems are perfect for a dual use in connection with the present invention, which is only activated when a vehicle is at a slower speed as it approaches an obstacle in its path.

In the presently preferred embodiment of the invention, the ECU 90 has an interface that responds to outputs from the OEM cruise control buttons 94, 96 and 98 when the OEM cruise control system is not in use. The OEM cruise control buttons are used to perform various functions. For example, the cruise control Main switch 94 can be used to turn the vehicle's cruise control functions on or off and to activate or deactivate the lift system. When the OEM cruise control system is turned off or is inactive, such as when the vehicle is travelling too slowly for the OEM cruise control system to function, and the lift system is turned on, the output from the Accel button 96 can be used, for example, to activate the lifting of the lift system and the vehicle. The ECU 90 can be programmed to respond to presses to the OEM cruise control buttons 96 and 98 whereby the ECU 90 will raise or lower the lift system when the OEM cruise control system is turned off or when the OEM cruise control system is inactive due to inadequate speed for the OEM cruise control system to function. The Decel button 98 can be used to initiate the lowering of the lift system. Alternatively, other existing switches may be used to control the lift system.

Prior art vehicle lift systems require the operator to take his eyes off the road so that a driver can look for and press an after-market manual switch that is added to the vehicle for raising and lowering of the vehicle. The use of the OEM cruise control system interface in the present invention provides a convenient and safer method for activating the lift system. It also eliminates the need for after-market switch(es) to be installed in the vehicle, which would require additional labor and costs.

The OEM cruise control system interface also enables the cruise control buttons to be used to select and activate other features, for example proximity sensors and speed sensors. The sensors or devices can be installed on or under the vehicle in one or more locations. The proximity sensors or devices are preferably adjusted or calibrated to activate the ECU and the lift system at the desired distances from obstacles. When a signal from the proximity sensor(s) to the ECU indicates that the sensor is closer to an obstacle than desired, the ECU activates the up valve(s) 84 to raise the vehicle away from the obstacle. The ECU uses various parameters, such as time and proximity, to check for the presence of obstacles, and automatically lowers the vehicle to the normal state when the desired conditions are met. The ECU may also receive input signals from a vehicle speed sensor. The ECU may use such information to control or limit the raising and/or lowering of the vehicle depending on the speed of the vehicle.

The ECU 90 may be programmed in a variety of ways. For example, the ECU 90 can be programed directly through the use of the push button(s) 92 and cruise control buttons 94, 96 and 98. It can also be configured through the use of a computer connected to the ECU and/or through the use of DIP switches, portable flash drives or other devices. The ECU 90 may also be programmed to modify its response to inputs (adjustment) regarding time durations for the activation of the up valve and down valve; delay time for the starting of the compressor pump upon starting the vehicle; duration for the vehicle to remain in the lifted position prior to activating the lowering of the vehicle; proximity distance settings for the automatic activation of the lifting and lowering of the vehicle; sensitivity and speed settings for the input signals from the proximity sensor(s); vehicle speed settings for various functions such as for limiting the lifting of the vehicle and for the automated lowering of the vehicle if excessive vehicle speed is detected. These types of parameters may be programmed into the ECU 90 and/or the user may select or adjust the parameters affecting the ECU 90 and its operation of the invention.

While the present invention has been disclosed in connection with the presently preferred embodiments described herein, it should be understood that there may be other embodiments which fall within this spirit and scope of the invention as defined by the claims. Accordingly, no limitations are to be implied or inferred in this invention except as specifically and as explicitly set forth in the claims.

INDUSTRIAL APPLICABILITY

This invention can be used whenever it is necessary to lift a vehicle to avoid a collision with an obstacle in the vehicle's path or for other reasons.

I claim:

1. A device for lifting a vehicle with a suspension system having a coil spring with a coil spring diameter, comprising:
   a hollow cylinder supporting said vehicle having a cylinder inner diameter larger than said coil spring diameter, with a cylinder top, cylinder top rim and cylinder side walls connected to and extending downwardly from said cylinder top rim to a cylinder bottom,
   wherein said cylinder top and said cylinder side walls define an inner cylinder bore, an inlet port extending into said cylinder, and an inner circumferential retaining ring groove at said cylinder bottom;
   a piston having a piston diameter less than said cylinder bore diameter, having a piston top, a piston top rim, and a piston lower circumferential rim with a rim diameter, mounted over said coil spring, and having a piston outer diameter and an outer circumferential piston-bore seal groove;
   wherein said piston is slidable within said cylinder bore;
   a substantially cylindrical piston skirt having a skirt inner diameter greater than said coil spring diameter and a skirt outer diameter less than said cylinder bore diameter, a skirt top and a skirt bottom, attached to said piston at said skirt top,
   wherein said piston diameter and said skirt outer diameter are sufficiently less than said cylinder bore diameter whereby said piston and said piston skirt can tilt within said cylinder bore by at least 5 degrees when said piston top is being assembled into said cylinder bore and said piston top becomes positioned entirely within said cylinder bore;
   a piston-bore seal retained in said piston-bore seal groove whereby said piston top, said cylinder top, said piston-bore seal, and said cylinder side walls form an expandable pressure space in said cylinder bore that is in fluid communication with said inlet port;
   a retaining ring retained in said inner circumferential retaining ring groove;
   whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

2. A device for lifting a vehicle with a suspension system having a coil spring with a coil spring diameter, comprising:
   a piston having a piston top, a piston top rim having a piston top rim diameter, a piston lower circumferential rim with a piston lower circumferential rim diameter, and a piston outer diameter;
   a hollow cylinder supporting said vehicle having a cylinder top, a cylinder top rim and cylinder side walls connected to and extending downwardly from said cylinder top to a cylinder bottom,
   wherein said cylinder top and said cylinder side walls define an inner cylinder bore having a cylinder bore diameter larger than said piston outer diameter and said piston lower circumferential rim diameter, and having an inlet port extending into said cylinder;

a substantially cylindrical piston skirt having a skirt outer diameter less than said piston outer diameter, said piston top rim diameter, said piston lower circumferential rim diameter and said cylinder bore diameter, and having a skirt inner diameter greater than said coil spring diameter, a skirt bottom and a skirt top, attached to said piston at said skirt top;

wherein said piston and said piston skirt are mounted over said coil spring, and slidable within said cylinder bore;

wherein said piston outer diameter and said skirt outer diameter are sufficiently less than said cylinder inner diameter whereby said piston and said piston skirt can tilt within said cylinder bore by at least 5 degrees when said piston top is being assembled into said cylinder bore and said piston top becomes positioned entirely within said cylinder bore;

a piston-bore seal mounted on said piston near said piston top whereby said piston, said cylinder, and said piston-bore seal form an expandable pressure space in said cylinder bore that is in fluid communication with said inlet port;

a circumferential retaining ring mounted on said cylinder near said cylinder bottom;

whereby when said retaining ring is mounted in said cylinder after said piston and said piston skirt have been assembled into said cylinder bore, said retaining ring prevents said piston and said piston skirt from tilting within said cylinder bore enough to prevent leaking of said piston-bore seal as said piston and piston skirt slide within said cylinder bore;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

3. A device for lifting a vehicle with a suspension system having a coil spring with a coil spring diameter, comprising:
a piston having a piston top;
a piston skirt having a skirt top and a skirt bottom, attached to said piston at said skirt top;
a hollow cylinder supporting said vehicle having an inner cylinder bore, an inlet port extending into said cylinder, and a cylinder bottom;
wherein said piston and piston skirt are mounted over said coil spring, and slidable within said cylinder bore;
wherein said piston and said skirt can tilt within said cylinder bore by at least 5 degrees when said piston top is being assembled into said cylinder bore and said piston top becomes positioned entirely within said cylinder bore;
a piston-bore seal mounted on said piston whereby said piston, said cylinder and said piston-bore seal form an expandable pressure space in said cylinder bore that is in fluid communication with said inlet port;
a circumferential retaining ring mounted on said cylinder near said cylinder bottom;
whereby when said retaining ring is mounted on said cylinder after said piston and said piston skirt have been inserted into said cylinder bore, said retaining ring prevents said piston and said piston skirt from tilting within said cylinder bore enough to prevent leaking of said piston seal as said piston and piston skirt slide within said cylinder bore;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

4. A device for lifting a vehicle with a suspension system having a coil spring with a coil spring diameter, comprising:
a piston having a piston top;
a piston skirt having a skirt top and a skirt bottom, attached to said piston at said skirt top; a hollow cylinder supporting said vehicle having an inner cylinder bore, an inlet port extending into said cylinder, and a cylinder bottom;
wherein said piston and piston skirt are mounted over said coil spring, and slidable within said cylinder bore;
wherein said piston and said piston skirt can tilt within said cylinder bore by at least 5 degrees when said piston top is being assembled into said cylinder bore and said piston top becomes positioned entirely within said cylinder bore;
a piston-bore seal mounted on said piston whereby said piston, said cylinder and said piston-bore seal form an expandable pressure space in said cylinder bore that is in fluid communication with said inlet port;
a circumferential retaining ring mounted on said cylinder near said cylinder bottom;
whereby said retaining ring prevents said piston and said piston skirt from tilting within said cylinder bore by more than 2 degrees when said piston and said piston skirt are positioned fully into the cylinder and said retaining ring is mounted on said cylinder;
whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

5. A device for lifting a vehicle with a suspension system having a coil spring with a coil spring diameter, comprising:
a hollow cylinder having a cylinder top, a cylinder bottom, an inner cylinder bore, and an inlet port extending into said cylinder;
a piston having a piston lower circumferential rim with a rim diameter mounted over said coil spring, and slidable within said cylinder bore;
a circumferential retaining ring with a retaining ring inner diameter smaller than said cylinder bore mounted on said cylinder near said cylinder bottom;
a piston-bore seal mounted on said piston whereby said piston, said piston-bore seal and said cylinder form an expandable pressure space in said cylinder bore that is in fluid communication with said inlet port;
a piston skirt having a piston skirt bottom and a skirt top attached to said piston at said skirt top and having an outer skirt diameter smaller than said rim diameter, smaller than said cylinder bore diameter and smaller than said retaining ring inner diameter;
wherein said piston skirt can slide within said cylinder bore and extend beyond said retaining ring and beyond said cylinder bottom, whereby said retaining ring does not limit the travel of said piston skirt; and wherein said rim diameter is larger than said retaining ring inner diameter, whereby said retaining ring prevents said piston lower circumferential rim and said piston from extending beyond said retaining ring; and wherein said retaining ring prevents said piston skirt and said piston from tilting within said cylinder enough to prevent leaking of said piston-bore seal as said piston and piston skirt slide within said cylinder bore;

wherein said piston skirt does not touch said cylinder bore when said piston slides within said cylinder, whereby said piston skirt does not cause any wear on said cylinder bore from contact between said skirt and said bore;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

6. A device for lifting a vehicle with a suspension system having a coil spring with a coil spring diameter, comprising:

a piston having a piston top, a piston top circumferential rim and a piston top outer diameter;

a substantially cylindrical piston skirt having a skirt outer diameter less than said piston top outer diameter, and having a skirt inner diameter greater than said coil spring diameter, a skirt bottom and a skirt top, attached to said piston at said skirt top;

a hollow cylinder supporting said vehicle with a cylinder top, a cylinder top rim and having cylinder side walls connected to and extending downwardly from said cylinder top to a cylinder bottom, wherein said cylinder top and said cylinder side walls define an inner cylinder bore having a cylinder bore diameter larger than said piston top outer diameter, said skirt outer diameter and said coil spring diameter, and an inlet port extending into said cylinder;

wherein said piston and piston skirt are mounted over said coil spring, and slidable within said cylinder bore;

wherein said piston top outer diameter and said skirt outer diameter are sufficiently less than said cylinder bore diameter whereby said piston and said piston skirt can tilt within said cylinder bore diameter by at least 5 degrees when said piston top is being assembled into said cylinder bore and said piston top becomes positioned entirely within said cylinder bore and oriented substantially perpendicular to the axis of said cylinder bore;

a circumferential retaining ring mounted on said cylinder near said cylinder bottom;

a piston seal mounted near said cylinder bottom whereby said piston, said cylinder, said retaining ring and said piston seal form an expandable pressure space in said cylinder bore that is in fluid communication with said inlet port;

whereby said piston and said piston skirt are prevented from tilting within said cylinder bore by more than 2 degrees when said retaining ring and said piston seal are mounted on said cylinder and said piston and said piston skirt are positioned fully into said cylinder;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

7. A device for lifting a vehicle with a suspension system having a coil spring with a coil spring diameter and a shock absorber with a shock absorber shaft and a shock absorber body, wherein said coil spring has a coil spring diameter and is coiled around said shock absorber shaft, and said shock absorber body has a body diameter smaller than said coil spring diameter, comprising:

a hollow cylinder having a cylinder inner diameter larger than said coil spring diameter, with a cylinder top, cylinder top rim, a cylinder-shaft aperture, a cylinder-shaft seal, and cylinder side walls connected to and extending downwardly from said cylinder top to a cylinder bottom, wherein said cylinder top and said cylinder side walls define an inner cylinder bore, an inlet port extending into said cylinder, and an inner circumferential retaining ring groove at said cylinder bottom, wherein said cylinder is sealingly mounted onto said shock absorber shaft through said cylinder-shaft aperture;

a piston having a piston diameter less than said cylinder bore diameter slidable within said cylinder bore having a piston top, a piston top rim, a piston-shaft aperture, a piston-shaft seal, an outer circumferential piston-bore groove, mounted over said coil spring, and having a piston outer diameter and an outer circumferential piston-bore seal groove, wherein said piston is slidable within said cylinder bore;

a substantially cylindrical piston skirt having a skirt outer diameter less than said cylinder bore diameter, a skirt top and a skirt bottom, attached to said piston at said skirt top;

wherein said piston diameter and said skirt outer diameter are sufficiently less than said cylinder bore diameter whereby said piston and said piston skirt can tilt within said cylinder bore by at least 5 degrees when said piston top is being assembled into said cylinder bore and said piston top becomes positioned entirely within said cylinder bore;

a piston-bore seal retained in said piston-bore seal groove whereby said piston top, said piston-shaft seal, said piston-bore seal, said cylinder top, said cylinder-shaft seal and said cylinder side walls form an expandable pressure space in said cylinder bore that is in fluid communication with said inlet port;

a retaining ring retained in said inner circumferential retaining ring groove;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

8. A device for lifting a vehicle with a suspension system having a coil spring with a coil spring diameter, a shock absorber with a shock absorber shaft and a shock absorber body, wherein said coil spring has a coil spring diameter and is coiled around said shock absorber shaft comprising:

a hollow cylinder having a cylinder inner diameter larger than said coil spring diameter, having a cylinder top with a cylinder shaft aperture, a cylinder top rim and having cylinder side walls connected to and extending downwardly from said cylinder top to a cylinder bottom, wherein said cylinder top and said cylinder side walls define a cylinder inner bore having said cylinder inner bore diameter larger than said piston outer diameter and an inlet port extending into said cylinder, wherein said cylinder is sealingly mounted onto said shock absorber shaft through said shaft aperture;

a piston having a piston top with piston-shaft aperture, a piston-shaft seal, a circumferential piston-bore seal groove, a piston top rim, and a piston outer diameter;

said piston top having a reduced diameter to allow said piston top to tilt at least 5 degrees within said cylinder bore when said piston top is being inserted into said cylinder bore;

a substantially cylindrical piston skirt having a skirt outer diameter less than said piston outer diameter and smaller than said cylinder bore diameter, and having a skirt inner diameter greater than said coil spring diameter, a skirt top and a skirt bottom, attached to said piston at said skirt top;

wherein said skirt outer diameter is sufficiently less than said cylinder inner diameter whereby said piston and said piston skirt can tilt within said cylinder bore by at least 5 degrees when said piston top is being assembled into said cylinder bore and said piston top becomes positioned entirely within said cylinder bore and oriented substantially perpendicular to the axis of said cylinder bore, and;

wherein said piston and piston skirt are mounted over said coil spring, and slidable within said cylinder bore;

a piston-bore seal mounted near said piston top whereby said piston, said piston-shaft seal, said piston-bore seal, said cylinder and said cylinder-shaft seal form an expandable pressure space that is in fluid communication with said inlet port;

a circumferential retaining ring mounted on said cylinder near said cylinder bottom;

whereby when said retaining ring is mounted in said cylinder after said piston and said piston skirt have been assembled into said cylinder bore, said retaining ring prevents said piston and said piston skirt from tilting within said cylinder bore enough to prevent leaking of said piston seal as said piston and piston skirt slide within said cylinder bore;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

9. A device for lifting a vehicle with a suspension system having a coil spring with a coil spring diameter, a shock absorber with a shock absorber shaft and a shock absorber body, wherein said coil spring has a coil spring diameter and is coiled around said shock absorber shaft comprising:

a piston having a piston top with a piston-shaft aperture, and a piston-shaft seal;

a piston skirt having a skirt top and a skirt bottom, attached to said piston at said skirt top;

a hollow cylinder having cylinder top with a cylinder shaft aperture and a cylinder-shaft seal, an inner cylinder bore, an inlet port extending into said cylinder, and a cylinder bottom;

wherein said piston and piston skirt are mounted over said coil spring, and slidable within said cylinder bore;

wherein said piston and said skirt can tilt within said cylinder bore by at least 5 degrees when said piston top is being assembled into said cylinder bore and said piston top becomes positioned entirely within said cylinder bore and oriented substantially perpendicular to the axis of said cylinder bore;

a piston-bore seal mounted on said piston whereby said piston, said piston-shaft seal, said piston-bore seal and said cylinder form an expandable pressure space that is in fluid communication with said inlet port;

a circumferential retaining ring mounted on said cylinder near said cylinder bottom;

whereby when said retaining ring is mounted on said cylinder after said piston and said piston skirt have been inserted into said cylinder bore, said retaining ring prevents said piston and said piston skirt from tilting within said cylinder bore enough to prevent leaking of said piston seal as said piston and piston skirt slide within said cylinder bore;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

10. A device for lifting a vehicle with a suspension system having a coil spring with a coil spring diameter, a shock absorber with a shock absorber shaft and a shock absorber body, wherein said coil spring has a coil spring diameter and is coiled around said shock absorber shaft comprising:

a piston having a piston top with a piston-shaft aperture, and a piston-shaft seal;

a piston skirt having a skirt top and a skirt bottom, attached to said piston at said skirt top;

a hollow cylinder having a cylinder top with a cylinder shaft aperture and a cylinder-shaft seal, an inner cylinder bore, an inlet port extending into said cylinder, and a cylinder bottom;

wherein said piston and said piston skirt are mounted over said coil spring, and slidable within said cylinder bore;

wherein said piston and said piston skirt can tilt within said cylinder bore by at least 5 degrees when said piston top is assembled and positioned entirely within said cylinder bore and oriented substantially perpendicular to the axis of said cylinder bore;

a piston-bore seal mounted on said piston, whereby said piston, said piston-shaft seal, said piston-bore seal, said cylinder and said cylinder-shaft seal form an expandable pressure space that is in fluid communication with said inlet port;

a circumferential retaining ring mounted on said cylinder near said cylinder bottom;

whereby said retaining ring prevents said piston and said piston skirt from tilting within said cylinder bore by more than 2 degrees when said retaining ring is mounted on said cylinder, and said piston and said piston skirt are positioned in said cylinder;

whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

11. A device for lifting a vehicle with a suspension system having a coil spring with a coil spring diameter, comprising:
- a hollow cylinder having a cylinder top with a cylinder shaft aperture and a cylinder-shaft seal, a cylinder bottom, an inner cylinder bore, and an inlet port extending into said cylinder;
- a circumferential retaining ring with an inner diameter smaller than said cylinder bore mounted on said cylinder near said cylinder bottom;
- a piston having a piston lower circumferential rim with a rim diameter and a piston top with a piston-shaft aperture;
- a piston-bore seal and a piston-shaft seal mounted on said piston whereby said piston, said piston bore seal, said piston-shaft seal, said cylinder and said cylinder shaft seal form an expandable pressure space that is in fluid communication with said inlet port;
- a piston skirt having a skirt bottom and a skirt top attached to said piston at said skirt top and having an outside skirt diameter that is smaller than said than said piston lower circumferential rim diameter, smaller than said cylinder bore diameter and smaller than said retaining ring inner diameter;
- wherein said piston skirt can slide within said cylinder bore and extend beyond said retaining ring and beyond said cylinder bottom;
- wherein said piston lower circumferential rim diameter is larger than said retaining ring inner diameter whereby said piston lower circumferential rim and said piston cannot extend beyond said retaining ring, and;
- wherein said retaining ring does not allow said piston skirt and said piston to tilt excessively within said cylinder;
- wherein said piston skirt does not touch said cylinder bore when said piston slides within said cylinder;
- whereby said piston skirt does not cause any wear on said cylinder bore from any contact between said skirt and said bore; and
- whereby said piston skirt creates a barrier to prevent contaminants from entering onto said cylinder bore;
- wherein said piston and piston skirt are mounted over said coil spring, and slidable within said cylinder bore;
- whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

12. A device for lifting a vehicle with a suspension system having a coil spring with a coil spring diameter, comprising:
- a piston having a piston top with a piston-shaft aperture, and a piston-shaft seal, a piston top rim and a piston outer diameter;
- a substantially cylindrical piston skirt having a skirt outer diameter, and having a skirt inner diameter greater than said coil spring diameter, a skirt top and a skirt bottom, attached to said piston at said skirt top;
- a hollow cylinder having a cylinder top with a cylinder shaft aperture and a cylinder-shaft seal, a cylinder top rim and cylinder side walls connected to and extending downwardly from said cylinder top to a cylinder bottom, wherein said cylinder top and said cylinder side walls define an inner cylinder bore having a cylinder bore diameter larger than said piston outer diameter, said skirt outer diameter and said coil spring diameter, and an inlet port extending into said cylinder;
- wherein said piston and piston skirt are mounted over said coil spring, and slidable within said cylinder bore; and
- wherein said piston outer diameter and said skirt outer diameter are sufficiently less than said cylinder bore diameter whereby said piston and said piston skirt can tilt within said cylinder bore by at least 5 degrees when said piston top is being assembled into said cylinder bore and said piston top becomes positioned entirely within said cylinder bore;
- a circumferential retaining ring mounted on said cylinder near said cylinder bottom;
- a piston skirt seal mounted near said cylinder bottom whereby said piston, said piston-shaft seal, said piston skirt, said cylinder, said cylinder-shaft seal, said retaining ring and said piston skirt seal form an expandable pressure space in said cylinder bore that is in fluid communication with said inlet port;
- whereby said piston and said piston skirt are prevented from tilting within said cylinder bore by more than 2 degrees when said retaining ring and said piston skirt seal are mounted on said cylinder and said piston and said piston skirt are positioned fully into the cylinder;
- whereby said device is activated when a pressurized fluid enters through said inlet port into said expandable pressure space and causes said piston and said cylinder to slide apart, thereby raising said vehicle, and deactivated when said pressurized fluid exits through said inlet port from said expandable pressure space and causes said piston and said cylinder to slide together, thereby lowering said vehicle.

13. A device for automatically maintaining ground clearance of a vehicle having a lift system, comprising:
- control unit means for controlling said lift system, operably connected to said lift system;
- ground clearance sensor means for sensing said vehicle's ground clearance in said vehicles path, operably connected to said control unit means;
- vehicle speed sensor means operably connected to said control unit means to sense excessive speed of said vehicle;
- wherein said control unit means automatically activates said vehicle lift system to lift said vehicle when said ground clearance sensor means senses less than said ground clearance in said vehicle's path;
- wherein said control unit means automatically deactivates said vehicle lift system to lower said vehicle when said ground clearance sensor means senses greater than said ground clearance in said vehicle's path;
- wherein said control unit means prevents activation of said vehicle lift system if said speed sensor means senses excessive speed of said vehicle; and
- wherein said control unit means deactivates said vehicle lift if said speed sensor means senses excessive speed of said vehicle.

14. A process for automatically adjusting ground clearance of a vehicle, comprising:
- providing a vehicle lift system, to lift and lower said vehicle to adjust said ground clearance;
- sensing ground clearance in said vehicle's path;
- sensing excessive speed of said vehicle;
- automatically activating said vehicle lift system if there is less than said ground clearance in said vehicle's path;
- automatically deactivating said vehicle lift system if there is more than said ground clearance in said vehicle's path;

preventing activating of said vehicle lift system if said vehicle is travelling at excessive speed; and
automatically deactivating said vehicle lift system if said vehicle travels at excessive speed.

* * * * *